US012603707B2

(12) United States Patent
Fryman et al.

(10) Patent No.: US 12,603,707 B2
(45) Date of Patent: Apr. 14, 2026

(54) MICRO-PHOTONICS PARALLEL DATA TRANSMISSION FABRIC AND INTERCONNECT

(71) Applicant: Intel Corporation, Santa Clara, CA (US)

(72) Inventors: Joshua B. Fryman, Corvallis, OR (US); Khaled Ahmed, San Jose, CA (US); Sergey Shumarayev, Los Altos Hills, CA (US); Thomas Liljeberg, San Jose, CA (US); Divya Pratap, Hillsboro, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 17/700,043

(22) Filed: Mar. 21, 2022

(65) Prior Publication Data

US 2023/0299851 A1     Sep. 21, 2023

(51) Int. Cl.
*H04B 10/25* (2013.01)
*G02B 6/42* (2006.01)
*H04B 10/50* (2013.01)

(52) U.S. Cl.
CPC ..... *H04B 10/25891* (2020.05); *G02B 6/4202* (2013.01); *G02B 6/423* (2013.01); *G02B 6/4246* (2013.01); *H04B 10/502* (2013.01)

(58) Field of Classification Search
CPC ............ H04B 10/25891; H04B 10/502; G02B 6/4202; G02B 6/423; G02B 6/4246
See application file for complete search history.

(56) References Cited

U.S. PATENT DOCUMENTS

| | | | |
|---|---|---|---|
| 10,412,806 | B2 | 9/2019 | Chong et al. |
| 10,651,357 | B2 | 5/2020 | Andrews |
| 10,985,143 | B2 | 4/2021 | Bower et al. |
| 11,387,221 | B2 | 7/2022 | Edmond et al. |
| 11,513,285 | B2 * | 11/2022 | Pezeshki ............... H01L 25/167 |
| 11,515,356 | B2 | 11/2022 | Pezeshki et al. |
| 2004/0197046 | A1 * | 10/2004 | Drost .................. H01L 25/0657 385/14 |
| 2005/0232638 | A1 | 10/2005 | Fucile et al. |
| 2008/0304833 | A1 | 12/2008 | Zheng |
| 2009/0067851 | A1 * | 3/2009 | Krishnamoorthy .......................... H01L 25/0657 398/164 |

(Continued)

FOREIGN PATENT DOCUMENTS

| | | |
|---|---|---|
| WO | 2019218775 A1 | 11/2019 |
| WO | 2020193724 A1 | 10/2020 |

OTHER PUBLICATIONS

International Search Report and Written Opinion for PCT Patent Application No. PCT/US23/10617, Mailed May 9, 2023, 13 pages.

*Primary Examiner* — Pranesh K Barua
(74) *Attorney, Agent, or Firm* — Compass IP Law PC

(57) ABSTRACT

A system enables optical communication with direct conversion of the electrical signal into an optical signal with an array of optical sources. The use of the array of optical sources can eliminate the need for a large serializer/deserializer (SERDES). With an array of optical sources, the optical communication can occur at lower power and lower frequency per optical source, with multiple parallel optical sources combining to provide a signal.

25 Claims, 15 Drawing Sheets

(56) References Cited

U.S. PATENT DOCUMENTS

| | | | |
|---|---|---|---|
| 2015/0263066 A1* | 9/2015 | Hu ....................... | H10H 20/817 |
| | | | 438/28 |
| 2017/0141847 A1* | 5/2017 | De Bruijn ............ | H04B 10/116 |
| 2018/0217344 A1* | 8/2018 | Fini ...................... | G02B 6/4249 |
| 2021/0080664 A1 | 3/2021 | Pezeshki et al. | |

* cited by examiner

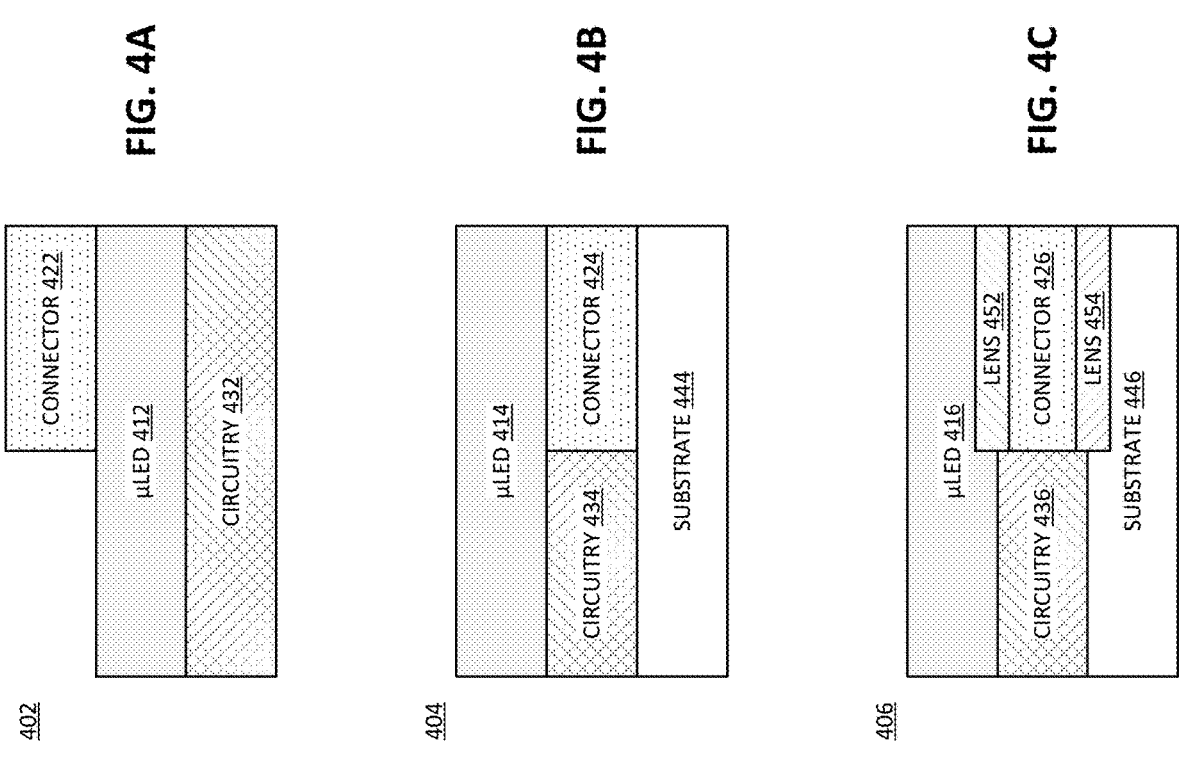
FIG. 4A
402
CONNECTOR 422
µLED 412
CIRCUITRY 432
FIG. 4B
404
µLED 414
CONNECTOR 424
CIRCUITRY 434
SUBSTRATE 444
FIG. 4C
406
µLED 416
LENS 452
CONNECTOR 426
LENS 454
CIRCUITRY 436
SUBSTRATE 446
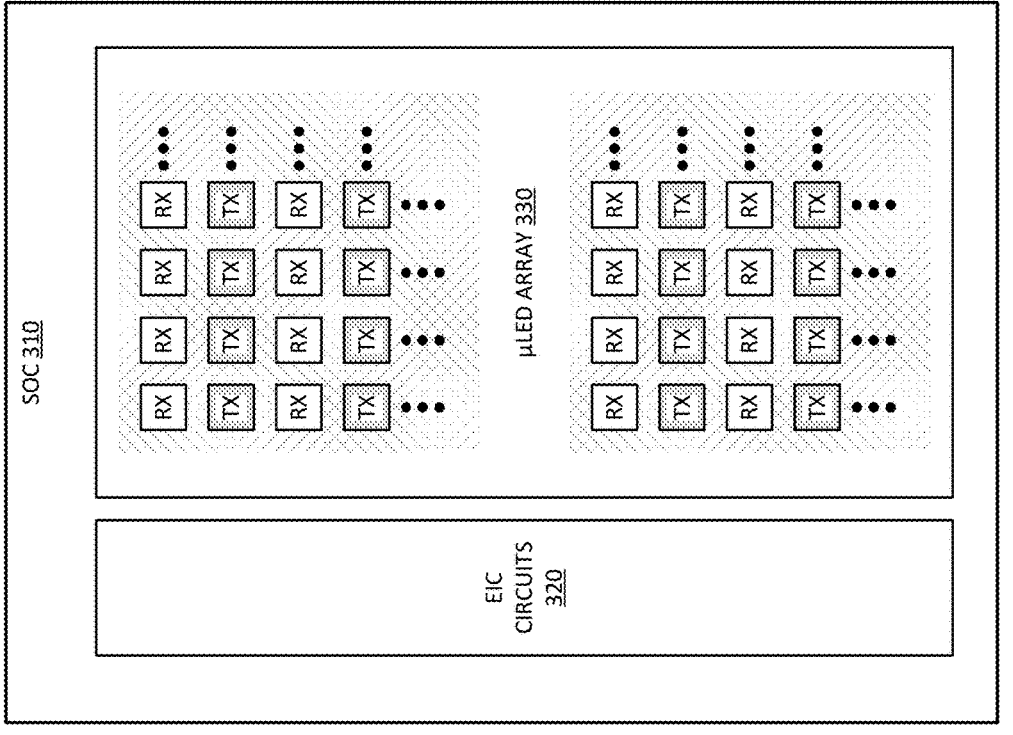
SOC 310
µLED ARRAY 330
EIC CIRCUITS 320
FIG. 3

502

μLED 512

SUBSTRATE 510

DRIVER 520

504

SUBST 510

μLED 512

DRIVER 520

CIRCUITS 522

SUBSTRATE 610

602

μLED 612

DRAM 630

CIRCUITS 622

DRIVER 620

604

SUBST 610

μLED 612

DRAM 630

DRIVER 620

CIRCUITS 622

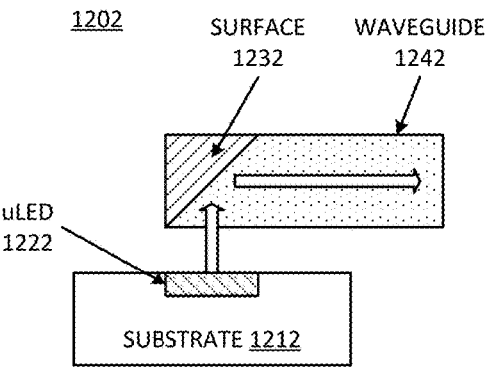
FIG. 12A
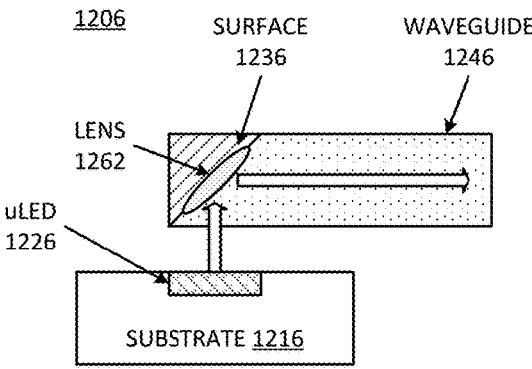
FIG. 12C
FIG. 12B
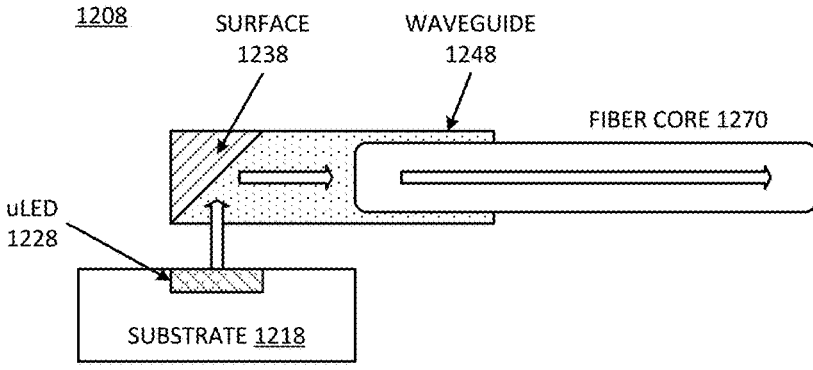
FIG. 12D

1502

FIBER BUNDLE 1552

CONN
1512

μLED
1522

EIC
1532

FIBER BUNDLE 1542

1504

FIBER 1554

CONN
1514

μLED
1524

CONN
1564

PIC
1562

EIC 1534

FIBER BUNDLE 1544

CONNECTOR
1600

PIN
1612

PIN
1614

FIBER
BUNDLE
1630

HOUSING
1620

ARRAY
1632

MICRO-PHOTONICS PARALLEL DATA TRANSMISSION FABRIC AND INTERCONNECT

FIELD

Descriptions are generally related to optical communication, and more particular descriptions are related to optical communication with micro-photonics devices.

BACKGROUND

Computer systems in server environments have frequent need to transfer large amounts of data between components separated by distances measured in the range of centimeters, as well as between components separated by distances much farther than short-centimeter lengths, even into the range of meters.

Currently, laser-based photonics are the leading candidate technologies for communication of the longer distances, such as communication from rack to rack in data centers or from chip to chip. Traditionally, a discrete laser pumps light into a silicon photonics chip that takes electrical signals from one device and produces light signals to transmit to other devices via optical fibers. Such an approach involves circuit complexity, increases cost for components, and has high power requirements, which results in requirements for cooling.

Traditionally, addressing the need for increased I/O (input/output) bandwidth involves driving electrical signals at higher speeds with more complex encoding methods. Increasing I/O to higher speeds and more complex encoding increases the need for BER (bit error rate) correction mechanisms to ensure proper communication between components. Modern application of electrical I/O (EIO) use a large serializer/deserializer (SerDes or SERDES). Increasing EIO data rates causes the SerDes to become a bottleneck, which increases latency of the communication.

Additionally, power efficiency in the SerDes path does not scale well with increasing EIO data rates, resulting in system power consumption that exceeds system specifications. Traditional laser-based silicon photonics optical I/O (OIO) typically uses materials (such as III-V semiconductor components) that increase component costs. Traditional laser communication also has high power requirements, requiring cooling, and increasing power consumption to levels that exceed system specifications.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 3 is a block diagram of an example of a micro-LED circuit.

FIGS. 4A-4C are block diagrams of examples of a micro-LED circuits that interface with connectors for a communication system.

FIGS. 12A-12D are block diagrams of examples of light routing circuits for micro-LED communication.

Figure 1:
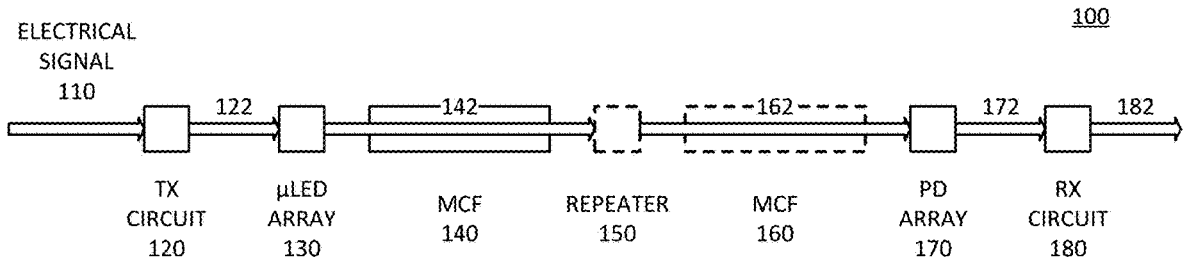
FIG. 1 is a block diagram of an example of a communication system based on an array of micro-scale light sources.

Descriptions of certain details and implementations follow, including non-limiting descriptions of the figures, which may depict some or all examples, and well as other potential implementations.

DETAILED DESCRIPTION

As described herein, a system enables optical communication with direct conversion of the electrical signal into an optical signal with an array of micro-scale optical sources. The use of the array of optical sources can eliminate the need for a large serializer/deserializer (SerDes or SERDES). With an array of optical sources, the optical communication can occur at lower power and lower frequency per optical source, with multiple parallel optical sources combining to provide a signal.

Reference to micro-scale optical devices can refer to optical transmitters, optical receivers, or optical transceivers integrated into or onto a semiconductor substrate. Each of the optical devices can have a footprint on the substrate of approximately less than 100 square microns (100 $\mu m^2$).

Thus, a micro-scale device as described herein can have a size on the order of single-digit microns per side for approximately square shapes, or in diameter for approximately round devices (e.g., device having dimensions of approximately 5 μm by 5 μm up to approximately 10 μm by 10 μm). In one example, each transmitter and each receiver has a footprint of less than 10 μm², with dimensions of approximately 1 μm by 1 μm to approximately 3 μm by 3 μm.

Reference to micro-scale optical devices can indicate optical devices that have dimensions in the micro (i.e., $10^{-6}$ meter) scale or smaller. Thus, the systems and configurations described can be implemented with optical devices in the micro-scale or with optical devices having dimensions in the nano (i.e., $10^{-9}$ m) scale. For simplicity in description throughout, reference is made to micro-optics or micro-scale devices, which will be understood to refer to devices having dimensions in the low (e.g., single digit) microns, or devices in having dimensions in the scale of nanometers.

A system with an array of micro-scale optical devices can replace traditional electrical input/output (EIO) transmission paths that run through a high-power SerDes to waveguides with a native on-die fabric conversion to optical input/output (OIO). The waveguides can be electrical or optical waveguides. The native conversion of electrical signals to OIO with an integrated array of micro-scale optical devices, such as a micro light emitting diode (μLED) array or array of vertical cavity surface emitting lasers (VCSELs).

Native conversion of electrical signals to OIO can improve power and performance requirements for input/output (I/O) in compute platforms with on-die fabrics. The use of micro-scale optical devices can be compatible with multiple different types of encoding, which allows for scalable data transmission rates. In one example, in place of a high-bandwidth signal from a laser source that transmits many sequential bits at high frequency, micro-scale optical transmitters and receivers can split a signal into multiple parallel parts and send a slower signal over many parallel links. The signal can be split at the transmitter end with the control circuitry into multiple parallel portions, and combined at the receiver end by optical receiver control circuitry.

It will be understood that laser light has greater range or reach in terms of the distance a signal can travel and still maintain a bit error rate within expected tolerances as compared to LED light. Thus, replacing a high-power light source with a lower-power light source will tend to result in an optical signal with a shorter reach. In one example, the system can include optical signal repeaters, similar to electrical re-timers, which can convert the optical signals into electrical signals and then regenerate the optical signals in the waveguides.

The system can include a plurality of waveguide bundles (such as a bundle of fiber cores) to transmit the optical signals from the array of optical sources. In one example, the system enables many-waveguide bundles to be manufactured without concern for relative rotation of fibers within the bundle, as long as the connectivity at each end is common. In one example, the system can apply alignment training operations to reduce the requirement for exact fiber placement within the connectors.

With the use of micro-optical device arrays integrated into a system chip, low energy, inexpensive optical technologies traditionally applied to consumer electronic devices can provide an optical communication system with many power-efficient devices in parallel. The consumer electronic devices can include television and computer displays, smart watches, AR/VR (augmented reality/virtual reality) displays, laptops, tablets, mobile phones, and so forth.

A communication system based on micro-scale optical devices can provide optical communication signals to a plurality of waveguides. The micro-scale optical device can convert EIO to OIO with data encodings that can sustain high bandwidth communication. The system can apply optical repeaters to extend the reach of LED devices. The system can enable self-training to provide resiliency and cable manufacturing corrections, reducing the need for precision manufacturing control over the alignment of the waveguides, which can have potentially dozens of waveguide cores having small diameter to transmit the optical signals.

FIG. 1 is a block diagram of an example of a communication system based on an array of micro-scale light sources. System 100 represents a communication system based on a data network with micro-optical devices. Electrical signal 110 represents a signal to be transmitted from one component to another component.

TX (transmit) circuit 120 represents an electrical transmission circuit that generates signal 122, which represents one or more control signals that trigger micro-optics to generate electrical signal 110 into an optical signal. μLED array 130 represents an array of micro-optic devices. The devices in the array are lower power than traditional laser communication devices, and can be integrated directly into a substrate without III-V materials.

μLED array 130 generates OIO to transmit over MCF (multicore fiber) 140. Signal 142 represents a parallel optical signal or OIO transmitted over MCF 140 by μLED 130. In one example, system 100 includes repeater 150 to repeat the OIO to extend the distance the optical signals can travel.

If system 100 includes repeater 150, system 100 includes MCF 160, which represents an optical second multicore waveguide to transmit repeated optical signal 162 to the target. If system 100 does not include repeater 150, MCF 140 can provide optical signal 142 directly to the target device.

PD (photodetector) array 170 represents an optical detector or photodiode in the receiving device. Signal 172 represents an electrical signal based on the conversion of optical signal 162 (or optical signal 142) into an electrical representation of the communication by PD array 170. RX circuit 180 represents a receive circuit in the electrical domain to transmit electrical signal 182 to a processor for processing at the receiving device. In contrast to a traditional optical communication system, system 100 includes μLED array 130, and corresponding PD array 170. PD array 170 can also be considered an array of micro-optical devices.

The arrays of micro-optical devices are intrinsically small, energy-efficient devices, which can provide high signal density in network fabrics between silicon dies. In one example, each data wire in the TX and in the RX direction is paired to one or more μLEDs for optical transmission or receiving detection, and paired to a circuit to amplify received photons. The pairing can represent a "pixel" in the transmit stage and receive stage, regardless of how many μLED devices in the array are used in the composition of the frequencies (colors) in the pixel. System 100 can represent an overall link assembly as a data channel between a first electronic device (a transmitter) and a second electronic device (a receiver). The transmitter and receiver for one transmission can swap roles for a subsequent transmission.

The use of μLED array 130 or other micro-scale optical devices in system 100 can enable a system with optical sources and optical receivers integrated directly into a system substrate without requiring special materials and special semiconductor processing needed for laser devices. The micro-optics can be driven directly by control circuitry, resulting in much faster processing of communication signals while using significantly less energy. It is estimated that micro-optics based communication can improve the speed and energy per bit by approximately 10-100× over traditional laser photonics.

In one example, system 100 can include μLED array 130 with μLED components measured on the order of 1 μm (micron) in size. In one example, system 100 can include μLED array 130 with μLED components that operate at data rates on the order of 1 GHz per μLED. Combining the small size and the data rate, system 100 can achieve a level of bandwidth from a piece of silicon that exceeds other approaches that rely on 2.5D or 3D interconnects for any kind of I/O technology. In contrast to laser photonics, in one example, system 100 can apply μLED technology that can run at extended temperature ranges, bypassing many of the precision cooling challenges and costs associated with standard laser-based photonics while consuming less energy per transmitted bit, on the order of 10× less energy. Such improvements are possible without the constant overhead power draw of a laser. The overall μLED technology can be implemented at a component-level cost that is much lower than more complex electrical connectors and cables, or laser-based photonic components (e.g., laser, connectors, cables).

Figure 2:
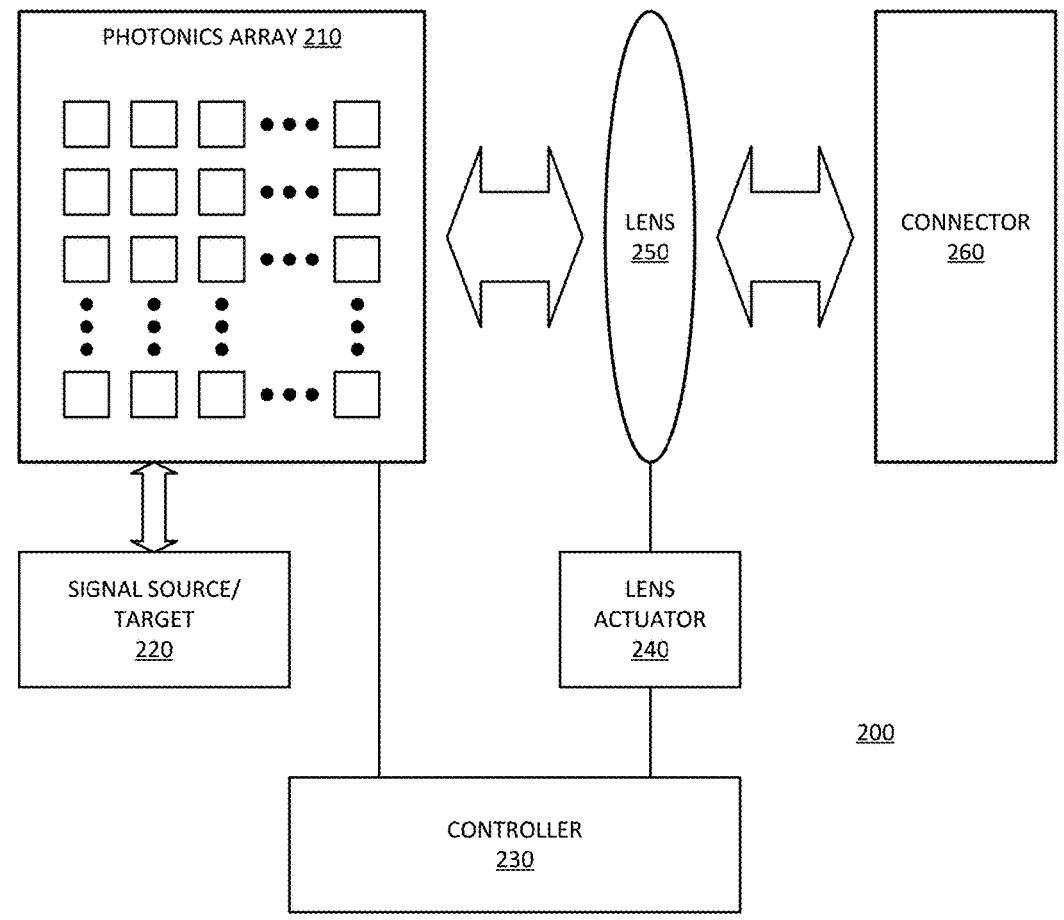
FIG. 2 is a block diagram of an example of a communication system with a connector to transmit light from a micro-scale light source.

FIG. 2 is a block diagram of an example of a communication system with a connector to transmit light from a micro-scale light source. System 200 represents an example of a communication system in accordance with an example of system 100.

The computational demands of compute devices, such as CPUs (central processing units), GPUs (graphics processing units), FPGAs (field programmable gate arrays), XPUs (accelerator processing units) or other accelerator devices, and interconnects, continues to show exponential growth. The demand for data throughput also rises exponentially to support the exponential growth of computational demand.

At the package level, such demand causes corresponding growth in pin count, which is heavily driven by memory requirements, such as volatile memory (e.g., DRAM (dynamic random access memory)) and nonvolatile memory (NVM). The demand for data throughput increases the demand for I/O, which means the overall package power to deliver a target I/O rate would continue expanding exponentially.

High-speed SerDes in electrical wires and silicon photonics are the leading candidates to continue the increase in I/O throughput. However, increasing to higher data rates tends to result in higher bit error rate (BER), leading to the implementation of mechanisms such as FEC (forward error correction) to control BER. BER control mechanisms tend to increase latency, which can work against the mechanisms employed to increase the data transmission rate. As area and energy increase due to the physical signaling requirements, complexity of the surrounding components (e.g., packages, boards, cooling) also increase, increasing system complexity.

In contrast to the traditional approaches, system 200 can reuse the native compute fabric of the on-die design of a system with a micro-optics array. Such an array can provide a "wide" interface (e.g., on the order of 100 bits wide per direction) that can achieve high throughput even at lower operating frequencies than used by current systems (e.g., at speeds on the order of 1 GT/s (giga-transfer per second) per wire as opposed to 10 GT/s). Current implementations of μLEDs can be less than 7 μm×7 μm in size, with power consumption on the order of 0.03 pJ/b (picojoules per bit), and with the ability to operate at 0.5-10 GT/s depending on device design. Even factoring in wiring and receiver gain from photodetectors, operation of μLED based communications is expected to be less than 0.5 pJ/b for current implementations. Future generations of μLED devices are expected to be on the order of 1 $\mu m^2$, with power requirements of approximately 0.1 pJ/b. The reach of μLEDs is expected to be significantly larger (O(1)m) than electrical signals such as PCIe(peripheral component interconnect express), CXL (compute express link), UPI (ultra path interconnect), DRAM (dynamic random access memory), or others (O(0.1)m), but much less than laser-based silicon photonics (O(100)m) or VCSEL (vertical cavity surface emitting laser) (O(10)m).

System 200 includes photonics array 210 for communication. In one example, photonics array 210 includes an array of μLEDs and an array of micro-scale photodetectors (PDs) that can detect LED light. In one example, photonics array 210 includes an array of VCSELs and an array of micro-scale PDs that can detect the VCSEL light. For simplicity, photonics array 210 will be referred to as array 210, which can include optical source devices and optical detection devices. In one example, array 210 can be referred to as a dense array, referring to having a large number (e.g., on the order of 100 or 1000) of optical devices. Such an array is dense in that it has the large number of optical devices integrated in the same substrate as an array of devices.

Signal source/target 220 represents a component that can generate an electrical signal to transmit through array 210. Signal source/target 220 represents a component that can receive an electrical signal from array 210 in response to detection of a signal from an external source. Signal source/target 220 can be, for example, a system on a chip (SOC) component or a CPU or other component on the SOC, an FPGA, a GPU, an accelerator, or other component.

Controller 230 represents control circuitry that can trigger the transmit operation of array 210. For transmission, signal source/target 220 represents a signal source to provide an electrical signal to array 210. In response to the signal and control signals from controller 230, array 210 converts the EIO to OIO with micro-optical transmitters. In one example, the transmitters send the optical signal through lens 250 to waveguides in connector 260. In one example, lens 250 is an optional component. Connector 260 can then transmit the optical signal to a target of the optical communication.

For receive, signal source/target 220 represents a signal target. Connector 260 can receive an optical signal from an external component and provide the optical signal through lens 250 to array 210. In one example, lens 250 is an optional component. Optical detection components of array 210 can detect the signal and convert the OIO to EIO to provide to signal source/target 220.

In one example, system 200 includes lens actuator 240, which represents one or more components to steer lens 250 to direct the optical communication signal. In one example, lens actuator 240 includes one or more mechanical components. In one example, lens actuator 240 includes one or more electrical components. Controller 230 can control the operation of lens actuator 240 to focus a received optical signal on the light detection components of array 210, or focus a transmit optical signal to waveguides of connector 260.

Array 210 can be an array of micro-scale optical device integrated into a system substrate, such as a silicon chip of a communication fabric. Controller 230 can drive the components of array 210 with electrical communication signals for transmit, and can control the components of array 210 with control signals for receive.

FIG. 3 is a block diagram of an example of a micro-LED circuit. SOC 310 represents an example of a semiconductor chip with a micro-optical array in accordance with an example of array 210.

SOC 310 includes EIC (electrical integrated circuit) circuits 320 and μLED array 330. μLED array 330 represents an array of micro-optical devices. μLED array 330 specifically illustrates transmit (TX) and receive (RX) devices. The arrangement of transmit and receive devices is not limiting, and any arrangement of transmitters and receivers can be used. EIC 320 circuits represent electrical circuits to control the operation of μLED array 330. In one example, the elements or individual devices of μLED array 330 represent devices of solid state materials, different from traditional organic LEDs. μLEDs can support very fast modulation by EIC circuits 320.

The components of μLED array 330 can be highly parallel, allowing smaller portions of an overall optical communication to be transmitted/received on individual optical paths. Such an array of wide optical paths can allow transmission at lower speeds, which can result in a wider interface that provides the high bandwidth, even at lower operating speeds, referring to multiple optical links operating at a slower speed relative to one optical link that would need to operate at a higher speed to achieve the same bandwidth. The optical devices of μLED array 330 can be driven directly by EIC circuits 320 without requiring a large, fast SerDes. In one example, EIC circuits 320 can include parallel SerDes paths for the array of devices of μLED array 330. Such SerDes paths could be simpler and more efficient than one large device trying to feed a high-speed laser optical link. In one example, SOC 310 includes simple, standard optical encoders in EIC circuits 320 instead of a large SerDes.

As mentioned above, micro-optical devices can be very small, with devices estimated to reach sizes as small as on the order of 1 $\mu m^2$. The individual devices of μLED array 330 can be of a size of approximately 50 $\mu m^2$, or 25 $\mu m^2$, or as low as 10 $\mu m^2$ or smaller. The devices of μLED array 330 can directly convert electrical signals to optical to drive the signal on a waveguide, drive onto a fiber core, or through a waveguide onto a fiber core.

The individual components of μLED array 330 can provide optical transmission as an array of μLED pixels for transmission, with a corresponding optical receiver on the target device. A pixel is composed of a number of μLEDs emitting distinct colors or light wavelengths, enabling μLED array 330 to provide multilevel optical signals. A multilevel optical signal here refers to a signal with different wavelengths or colors, rather than an optical signal having different signal amplitudes.

In one example, μLED array 330 is designed and laid out in an arbitrary pattern. The pattern can be structured into a collection of transmit and receive sites per channel of I/O transmission required. In one example, μLED array 330 has an arrangement of individual components or groups or collections of components to have multiple μLEDs transmit the same optical signal together as a single pixel.

Different groups of multiple μLEDs can transmit different color signals, for example, with one group of μLEDs as one pixel transmitting one wavelength optical signal, another group of μLEDs as a second pixel transmitting a second wavelength optical signal, and so forth. The color mixing by μLED array 330 can produce a light pulse with specific standard color coordinates that can be deciphered at the photodetector side of the link. In one example, the maximum count of elements of the μLED array in a pixel is determined by the diameter of the individual fiber cores in the waveguide media, as well as the manufacturing tolerance for aligning waveguides to emitter/detector arrays.

In one example, each μLED-based pixel is transmitted down one waveguide fiber. In one example, multiple pixels are encompassed with multicore fiber material. In contrast to laser-based and VCSEL-based photonics, μLEDs can operate with very inexpensive plastic waveguide material that is commonly used in medical and science programs, such as light sources in dental offices, or cameras for interior inspection of living organisms, or factory lines. μLED technology is also capable of operating at extended temperature ranges and does not require complicated cooling solutions typical for standard silicon photonics and their associated laser modules.

In one example, μLED array 330 represented μLED devices integrated into a silicon substrate of SOC 310. In one example, μLED array 330 can provide a signal density of approximately 1 TB/s/mm$^2$ (terabyte per second per square millimeter) off the silicon substrate.

In one example, μLED array 330 has roughly 2K (e.g., 2048) sites for transmission and reception of data. As described in more detail below, in one example, the micro-optical components can include components having transmit and receive capability, with the optical device structure capable of being a transmission/emitter device, or a receiver/detector of photonic energy. The mapping of individual TX/RX sites to I/O channels at the electrical level (e.g., ×16 lanes, ×8 lanes, ×11 lanes) can be any configuration, as long as the physical connector to move the optical signals from the μLED photonics to the other end for detection reflects the physical mapping applied.

In one example, the individual components of μLED array 330 can be other optical or light sources, such as μVCSELs emitting light in visible-infrared range. In a specific example, the array of micro-optical devices can be an array of μVCSELs emitting light with wavelengths of 620 nm, 625 nm, 630 nm, and 635 nm in a 4 color μVCSEL array.

In one example, μLED array 330 needs support mechanisms for operation. A specific example can include the use of a voltage shifter or charge capacitor to increase voltage to reach the diode activation level (e.g., increasing from 0.7 V to 3 V). On the detector side, traditional photodetector circuits generate current in the nA (nano-Ampere) range, which can benefit from detection and amplification circuits with noise isolation.

In one example, the μLED array or other micro-optical device array is stacked on top of an underlying CMOS (complementary metal-oxide-semiconductor) circuit. The following illustrates different examples of μLED circuits combined with CMOS circuits.

FIG. 4A is a block diagram of an example of a μLED circuit with a vertical connector interface for a communication system. Circuit 402 includes μLED 412, which represents a substrate with a μLED array, and circuitry 432, which represents electronic circuits that provide electrical signals to μLED 412 for transmission and receive electrical signals from micro-receivers.

In one example, μLED 412 is bonded to circuitry 432 by TGV (through glass via) attachment and connection to combine a μLED die or wafer to a CMOS die or wafer. The layers can thus be fused during the manufacture and assembly process.

Connector 422 represents a connector interface to the μLED circuits of μLED 412. Connector 422 can be or include waveguides or lenses to enable a connector to connect vertically to the circuit.

FIG. 4B is a block diagram of an example of a μLED circuit with a horizontal connector interface for a communication system. Circuit 404 includes μLED 414, which represents a substrate with a μLED array, and circuitry 434, which represents electronic circuits that provide electrical signals to μLED 414 for transmission and receive electrical signals from micro-receivers. In one example, circuitry 434 is part of substrate 444.

In one example, μLED 414 is bonded to circuitry 434 by TGV attachment and connection to combine a μLED die or wafer to a CMOS die or wafer. The layers can thus be fused during the manufacture and assembly process. In one example, the combination of μLED 414 and circuitry 434 can be mounted to substrate 444.

Connector 424 represents a connector interface to the μLED circuits of μLED 414. Connector 424 can be or include waveguides or lenses to enable a connector to connect vertically to the circuit. In one example, connector 424 represents waveguide structures integrated onto or into substrate 444. Connector 424 can enable a horizontal interface to the circuit.

FIG. 4C is a block diagram of an example of a μLED circuit with a horizontal connector interface with lenses for a communication system. Circuit 406 includes μLED 416, which represents a substrate with a μLED array, and circuitry 436, which represents electronic circuits that provide electrical signals to μLED 416 for transmission and receive electrical signals from micro-receivers. In one example, circuitry 436 is part of substrate 446.

In one example, μLED 416 is bonded to circuitry 436 by TGV attachment and connection to combine a μLED die or wafer to a CMOS die or wafer. The layers can thus be fused during the manufacture and assembly process. In one example, the combination of μLED 416 and circuitry 436 can be mounted to substrate 446.

Connector 426 represents a connector interface to the μLED circuits of μLED 416. Connector 426 can be or include waveguides or lenses to enable a connector to connect vertically to the circuit. In one example, connector 426 represents waveguide structures integrated onto or into substrate 446. Connector 426 can enable a horizontal interface to the circuit.

In one example, circuit 406 includes lenses 452 or lenses 454, or both. The lenses can provide optics to collimate and focus the light signals to send the optical energy into the waveguides. In one example, lenses 452 or lenses 454 can be part of the plane of connector 426.

Figure 5:
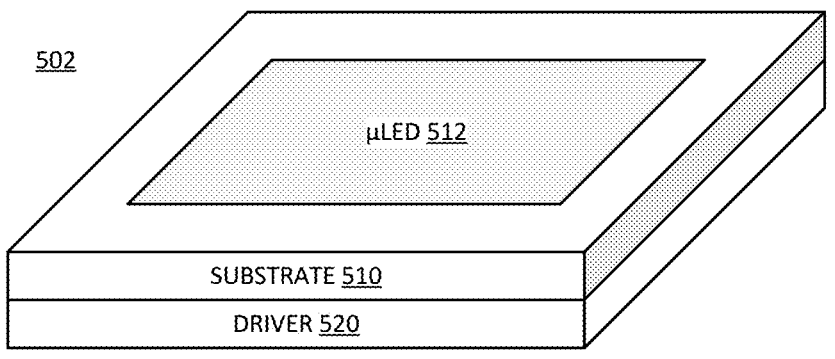
FIG. 5 is a block diagram of an example of a micro-LED stacked circuit.

FIG. 5 is a block diagram of an example of a μLED stacked circuit. Circuit 502 represents a perspective view of a μLED circuit. Circuit 504 represents a cross section view of circuit 502.

Circuit 502 illustrates μLED 512, which is a μLED circuit or μLED array integrated into or onto substrate 510. Driver 520 represents a substrate with electronic circuitry in a substrate that can provide electrical signals to drive the μLEDs. Driver 520 could be part of or could be the controller for the communication of μLED 512. Circuit 504 illustrates circuits 522 in driver 520 to implement the control operations to drive μLED 512.

In one example, substrate 510 and driver 520 represent different wafers or different substrates that are combined with wafer-to-wafer or substrate-to-substrate bonding to combine a μLED chip to a modulation or driver chip into a single package. Circuit 504 illustrates circuits 522 in a different plane from μLED 512.

Figure 6:
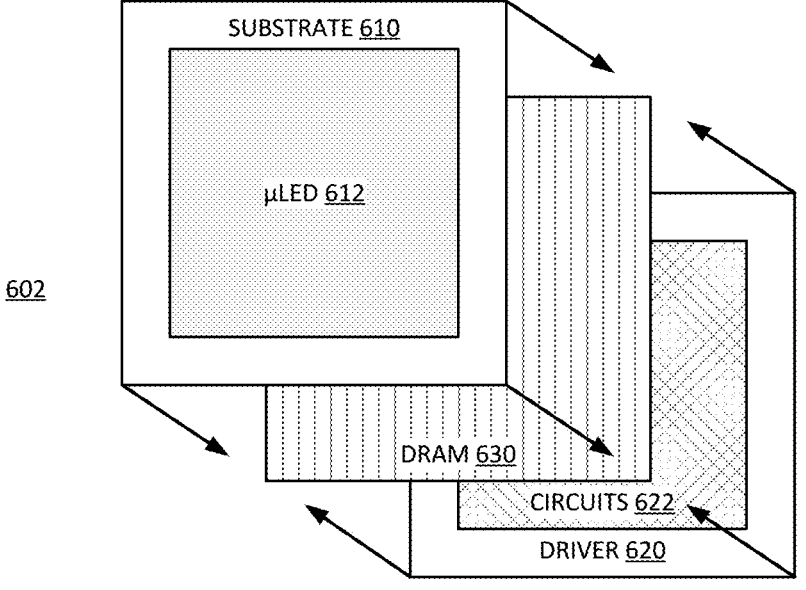
FIG. 6 is a block diagram of an example of a micro-LED stacked circuit with a memory layer.

FIG. 6 is a block diagram of an example of a μLED stacked circuit with a memory layer. Circuit 602 represents a top-perspective view of a μLED circuit stack with a DRAM substrate stacked with the μLED and driver substrates. Circuit 604 represents a cross section view of circuit 602.

Circuit 602 illustrates substrate 610 with μLED 612, which is a μLED circuit or μLED array integrated into or onto substrate 610. Driver 620 represents a substrate with circuits 622, which represent electronic circuitry in a substrate that can provide electrical signals to drive the μLEDs. Driver 620 could be part of or could be the controller for the communication of μLED 612. In one example, DRAM 630 represents DRAM circuitry or other memory circuits made inline with driver 620.

Circuit 604 illustrates circuits 622 in driver 620 to implement the control operations to drive μLED 612. DRAM 630 can be in a plane above circuits 622. Substrate 610 can sit over driver 620 and DRAM 630 to provide a communication circuit.

In one example, substrate 610 and driver 620 represent different wafers or different substrates that are combined with wafer-to-wafer or substrate-to-substrate bonding to combine a μLED chip to a modulation or driver chip into a single package. In one example, DRAM 630 is formed in or on driver 620 prior to bonding with substrate 610. Circuit 604 illustrates circuits 622 in a different plane from μLED 612.

Figures 7, 8A, 8B, 8C:
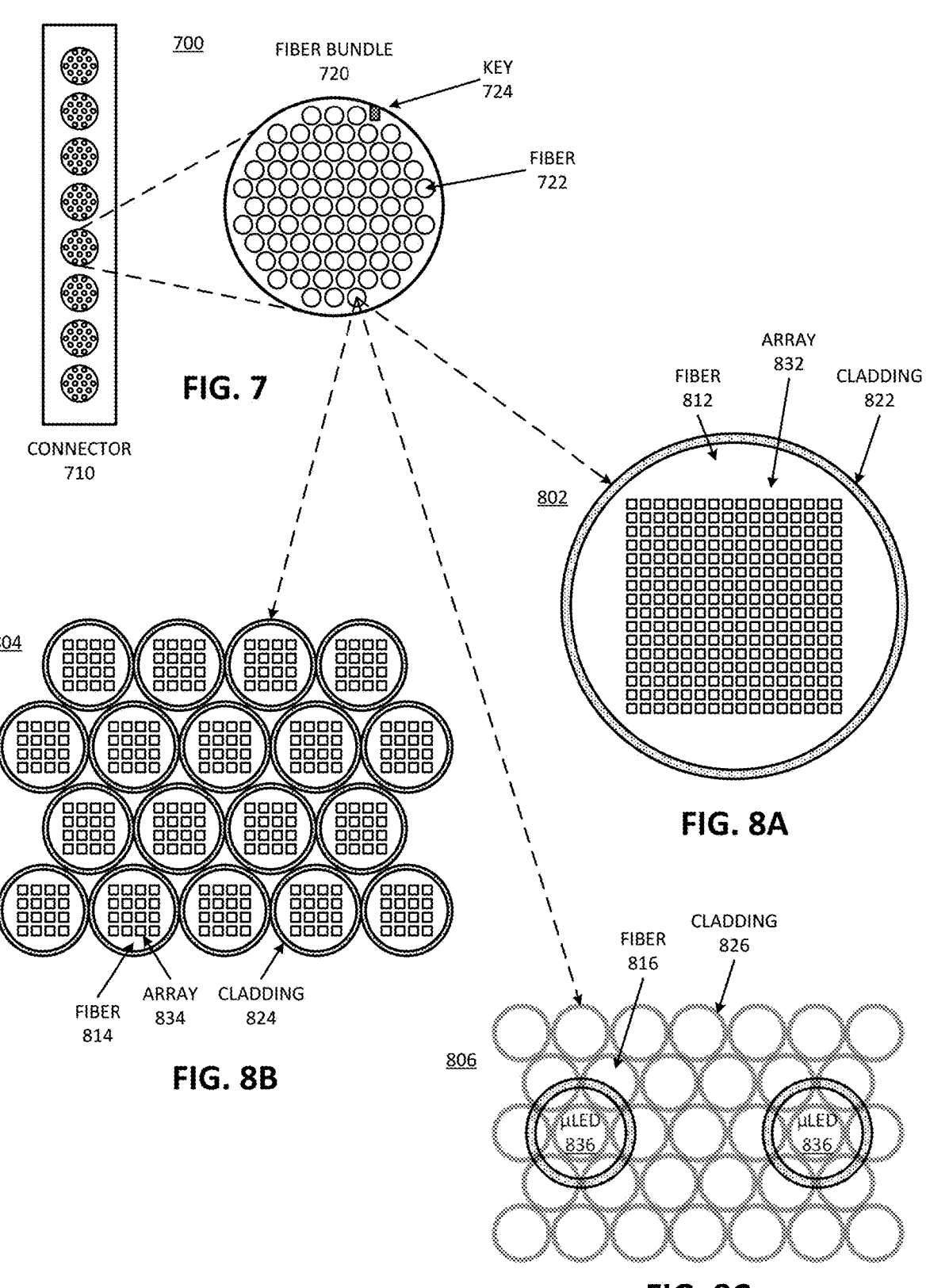
FIG. 7 is a block diagram of an example of a micro-LED connector.
FIGS. 8A-8C are block diagrams of examples of overlap of fiber cores with micro-scale light sources.

FIG. 7 is a block diagram of an example of a micro-LED connector. System 700 includes connector 710, which includes a bundle of fibers or fiber cores or waveguides to transmit optical signals. Connector 710 is illustrated from a front view, where different fiber bundles 720 would be oriented over a μLED array or an array of waveguides that carries signals between connector 710 and a μLED array.

Fiber bundle 720 can represent a port of connector 710. Traditionally, fiber bundle 720 would include key 724 as an alignment guide for fibers 722. In one example, key 724 is not needed due to the application of alignment training as described in more detail below. In one example, each fiber bundle 720 includes an alignment key 724. μLED technology allows for "non-lineal" arrangement of fibers 722.

The number of fibers 722 in each port or each fiber bundle 720 can vary depending on the implementation. The number of fibers 722 could be as few as 6 or 8 fibers, or could include dozens or hundreds of fibers. Fibers 722 can represent a plurality of optical waveguides onto which μLEDs can drive optical signals, and which can carry transmit optical signals to receivers or photodetectors. Connector 710 includes a housing to house optical fiber bundles for optical communication between optical sources and corresponding optical receivers.

In one example, each fiber 722 is a fiber core to receive multiple optical signals from multiple optical sources. In one example, each fiber 722 is a fiber core to receive optical signals from a single optical source.

In one example, each fiber 722 has a diameter or a size of approximately 50 μm to interconnect a group of optical sources and receivers for a "pixel" as described above. The diameter could be larger or smaller.

FIGS. 8A-8C are block diagrams of examples of overlap of fiber cores with micro-scale light sources. The different overlap scenarios represent different fibers, which can be example of fiber 722 of system 700.

There are different options for the alignment of fiber waveguides to micro-optical devices. One option is to have one fiber core for multiple micro-optical devices (system 802 and system 804). Another option is to have multiple fiber cores per micro-optical device (system 806).

In one example, to support multiple μLEDs per pixel, an electro-optical assembly includes a pixel having at least two μLEDs emitting different wavelengths (e.g., blue and green), multimode and multicore optical fiber, and a receiving array of photodetectors tuned to detect the color primaries provided by the transmitting μLEDs. In general, use of N μLEDs with different wavelengths per waveguide can represent 2^N possible values. For example, the use of two-color "pixels" on the transmitting end enables the coding of data using four different levels (2^2=4): (1) Blue+OFF, (2) Blue+Green, (3) OFF+Green, (4) OFF+OFF. It will be understood that a clock should be propagated with the data signal to synchronize both sides for detecting "off" periods. If three μLEDs are used to code the data on the transmitting end, the system has eight different levels (2^3=8), and if four μLEDs are used to code the data on the transmitting end, the system supports sixteen different levels (2^4=16).

In one example, the transmission end of the optical link is composed of a plurality of multi-μLED pixels, where each pixel has at least two μLEDs emitting two different colors. Multicolor μLEDs can be produced on a single silicon substrate using nanowire LED technology, described in more detail below. The color is determined by the core of the initial nanowire, thus allowing the use of nanolithography to define emission color from a nanowire LED.

System 802 and system 804 can support such multi-color pixels.

FIG. 8A represents system 802 with an example of a waveguide much larger than the micro-optical devices. Fiber 812 represents a fiber core to transmit light or optical signals from multiple devices for transmit or to multiple devices for receive. Cladding 822 represents a cladding or coating on fiber core 812 to reduce the loss of optical energy during transmission.

Array 832 represents an array of micro-optical devices. Specifically, 256 devices are illustrated in a 16×16 array. The array does not have to include the same number of rows and columns. As illustrated, the devices in array 832 are densely packed with spacing between the devices being approximately one device width or less. In one example, the spacing of the devices is more typical spacing of at least approximately two device widths between the devices.

Applying a pixel configuration to multiple μLEDs of an array results in a higher speed data link. For example, if each μLED transmits one bit of data at 1 GHz rate, then a pixel with two μLEDs will transmit data at 2^2 "bits" times 1 GHz, for a total of 4 Gbps (gigabits per second). For the 256-pixel array of system 802, the overall data rate would be 256 b×4 GHz=1 Tbps (terabits per second). For pixels that are composed of three μLEDs, a 256-pixel array with the same example transmission rates would produce 256 b×8 GHz=2 Tbps, and so on. Such high bandwidth communication is possible even while the individual μLEDs consume much lower energy per bit as compared to traditional laser-based communication.

FIG. 8B represents system 804 with an example of a waveguide much large than the micro-optical devices. Fiber 814 represents a fiber core to transmit light or optical signals from multiple devices for transmit or to multiple devices for receive. Cladding 824 represents a cladding or coating on fiber core 814 to reduce the optical losses during transmission.

Array 834 represents an array of micro-optical devices. Specifically, 16 devices are illustrated in a 4×4 array. Array 834 is a smaller array than array 832. As illustrated, the devices in array 834 are densely packed with spacing between the devices being approximately one device width or less. In one example, the spacing of the devices is more typical spacing of at least approximately two device widths between the devices.

With array 834, a similar approach to pixels of multiple colors or primary frequencies as described above with reference to array 832. System 802 illustrates a 4×4 μLED grid per pixel on a single fiber core, with multiple cores that in the aggregate will carry a very large amount of bandwidth. The configuration of system 804 can provide higher tolerance margins for fiber alignment or fiber placement relative to the arrays.

FIG. 8C represents system 806 with an example of waveguides smaller than the micro-optical devices. System 806 represents μLED 836, which will be μLEDs of an array. System 806 illustrates fibers 816 having diameters smaller than the diameter of μLED 836. Fibers 816 can include cladding 826 to reduce optical loss from the fibers during transmission.

In one example, the use of the fiber bundle in carrying data between TX and RX sites relies on the fiber sizes being significantly smaller than the micro-optic device dimensions. For μLEDs of the sizes referred to above, the configuration of system 806 may require fiber cores having diameters less than 2.5 μm, with a multicore fiber array being assembled from a "sea" of narrow-diameter waveguides that are densely packed.

Figure 9:
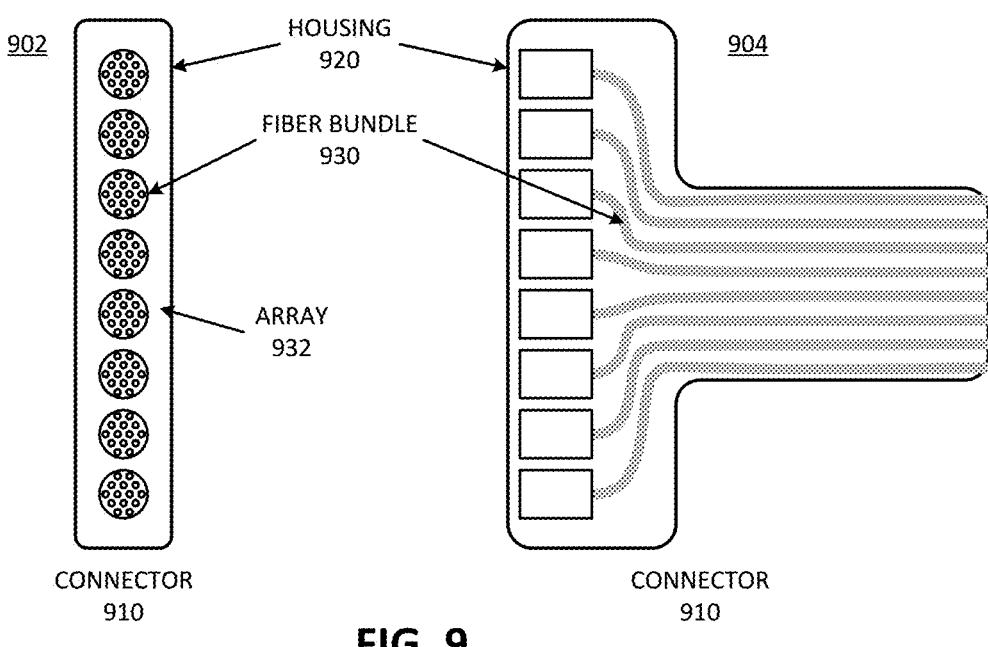
FIG. 9 is a block diagram of an example of a micro-LED connector with multiple fiber bundles.

FIG. 9 is a block diagram of an example of a micro-LED connector with multiple fiber bundles. View 902 provides a front view of connector 910, which represents a connector in accordance with an example of connector 710 of system 700. View 904 illustrates a side view of connector 910.

Connector 910 includes housing 920, which provides structural support for fiber bundles 930. Fiber bundles 930 represent groups or pluralities of fiber cores or fiber waveguides to transmit optical signals between TX and RX sites. Array 932 represents a front view of the bundle of fibers, and will interface with an array of micro-optical devices, where one or more micro-optical devices that transmit a signal or receive a signal represent TX and RX sites, respectively. In one example, a TX site or an RX site corresponds to a pixel as described above.

In one example, connector 910 can include fiber bundles 930 that each include dozens or hundreds of fiber cores. The collection of fibers in connector 910 can be on the order of thousands, potentially on the order of 100,000 fibers, while overall having a very small bundle diameter. The small overall size can be achieved when fibers have diameters measuring as small as single digit or 10s of microns.

The example of connector 910 specifically illustrates 8 ports or channels, where each channel could correspond to different functions and data rates, such as PCIe/CXL ×16, UPI ×24, HBM3, DDR6, and so forth. Each optical fiber bundle 930 in a channel has a high number of waveguides bundled together. In one example, each bundle includes a physical key to ensure alignment of the fibers between two end points. In one example, alignment between TX and RX sites is achieved through optical training, as described in more detail below.

Figure 10:
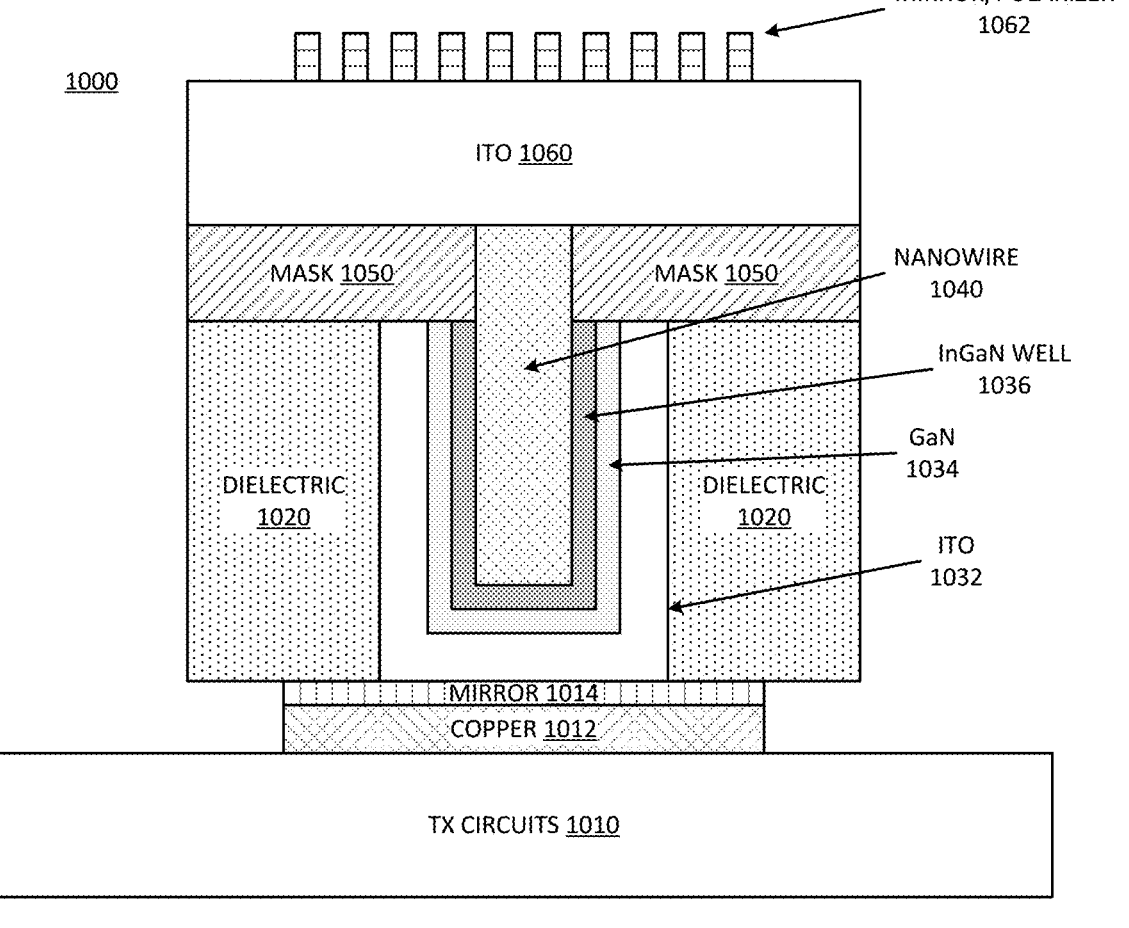
FIG. 10 is a circuit diagram of an example of a nanowire LED.

FIG. 10 is a circuit diagram of an example of a nanowire LED. Circuit 1000 represents a nanowire device with emission from the sidewalls. Circuit 1000 represent a cross section view of an LED circuit device. The device can have a width (or a diameter as seen from the top) measured on the order of single-digit microns, even when multiple nanowires are used in parallel.

TX circuits 1OIO represent transmit circuits of a substrate on which the μLED is integrated. In one example, copper layer 1012 is integrated on TX circuits 1OIO, and mirror 1014 is integrated onto copper 1012. Mirror 1014 represents a glass layer on a metal with high reflectivity, which could be aluminum or other metal on copper 1012.

Dielectric 1020 represents an electrical insulator, such as an oxide or nitride material. ITO (indium tin oxide) 1032 represents an oxide that is transparent at wavelengths of interest. Nanowire 1040 represents a doped Group III nitride, such as GaN (gallium nitride). InGaN (indium gallium nitride) well 1036 represents a carrier source for nanowire 1040, and sits between nanowire 1040 and GaN (gallium nitride) 1034 or other Group III nitride. GaN 1034 can be undoped, with InGaN 1036 providing a band gap for nanowire 1040. The thickness and materials can be controlled to achieve a desired bandgap for a desired frequency of light transmission.

Mask 1050 provides a vertical barrier for light energy within the nanowire circuit, and dielectric 1020 provides a horizontal barrier. ITO 1060 is above nanowire 1040, over the portion of nanowire 1040 that extends through mask 1050. Mirror/polarizer 1062 is formed on top of ITO 1060. When charge is applied to circuit 1000, nanowire 1040 emits photons, which can pass around the cavity formed by dielectric 1020 and mask 1050, with mirror 1014 providing a lower surface to reflect the optical energy back up.

Thus, circuit 1000 can have a resonant-cavity structure for light emission. In one example, instead of a single nanowire 1040, circuit 1000 can include a 2×2 array or other array of nanowires with multiple nanowire structures. Multiple nanowires in the circuit can enable more specific control over wavelength. With multiple nanowires, circuit 1000 can be a micro-LED with an array of separately controllable nanowires to enable specific control of the μLED emission.

Mirror/polarizer 1062 can reflect some light back into the circuit and polarize light that passes through. Mirror/polarizer 1062 can be referred to as a metasurface mirror patterned to form a cavity with mirror 1014 at the other end of nanowire 1040. In one example, mirror 1014 is formed during fabrication of the micro-LED structure. In one example, mirror/polarizer 1062 is formed after the flip-chip transfer of the μLEDs to the TX die substrate.

Figure 11C:
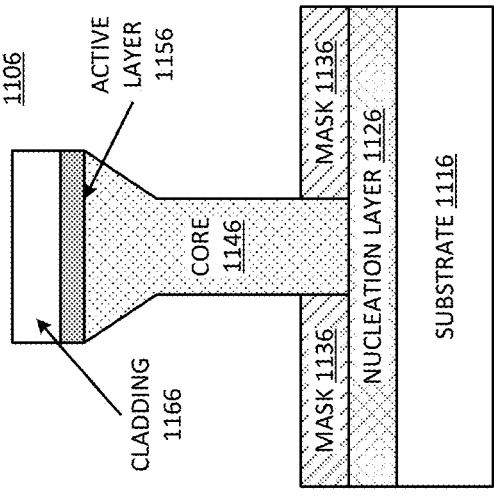
FIGS. 11A-11C are circuit diagrams of examples of an LED.
Figure 11B:
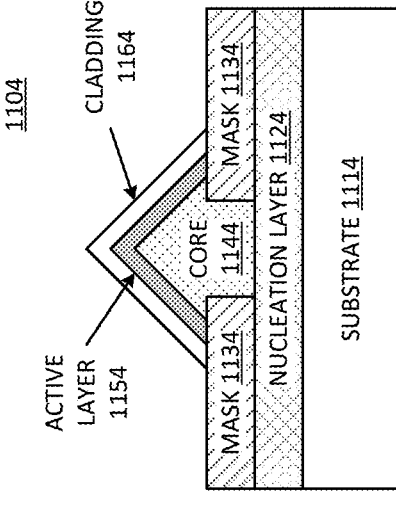
Figure 11A:
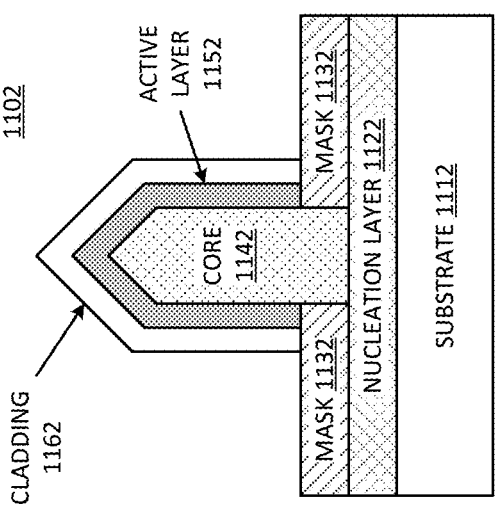

FIGS. 11A-11C are circuit diagrams of examples of a μLED. The μLED structures of circuit 1102, circuit 1104, and circuit 1106 can be alternative structures to circuit 1000. Each of the circuits is shown in a cross section of selected components. The structures do not necessarily illustrate all layers or structural components.

For light emitting devices, such as light emitting diodes (LED), the emission wavelength is determined by the band gap of the active region of the LED together with thickness that determines the confinement effects. Often the active region includes one or more quantum wells (QW). For Group III-nitride based LED devices, such as GaN based devices, the active region (e.g., quantum well) material is preferably ternary, such as some form of indium-gallium-nitride. The band gap of such III-nitride devices is dependent on the amount of group III element (e.g., indium) incorporated in the active region (e.g., in the QW(s)). Higher doping will yield a smaller band gap and thus longer wavelength of the emitted light.

Circuit 1102 illustrates a coaxial (core-shell) nanowire structure. Circuit 1102 includes substrate 1112 with nucleation layer 1122, mask 1132, and core 1142, where core 1142 is the nanowire material. Core 1142 can be in contact with nucleation layer 1122 through a gap in mask 1132.

In one example, core 1142 has an elongated structure extending further away from nucleation layer 1122 than the diameter of the core. In one example, circuit 1102 includes active layer 1152 in contact with core 1142 over mask 1132, and cladding 1162 over active layer 1152.

Circuit 1104 illustrates a nanopyramid nanowire structure. Circuit 1104 includes substrate 1114 with nucleation layer 1124, mask 1134, and core 1144, where core 1144 is the nanowire material. Core 1144 can be in contact with nucleation layer 1124 through a gap in mask 1134.

In one example, core 1144 has a pyramidal structure extending away from nucleation layer 1124 at a height on the order of the diameter of the core. In one example, circuit 1104 includes active layer 1154 in contact with core 1144 over mask 1134, and cladding 1164 over active layer 1154.

Circuit 1106 illustrates an axial nanowire structure. Circuit 1106 includes substrate 1116 with nucleation layer 1126, mask 1136, and core 1146, where core 1146 is the nanowire material. Core 1146 can be in contact with nucleation layer 1126 through a gap in mask 1136.

In one example, core 1146 has an elongated structure extending away from nucleation layer 1126 at a height greater than a diameter of the core. In one example, circuit 1106 includes active layer 1156 in contact with core 1146 and cladding 1166 over active layer 1156. In contrast to circuit 1102, active layer 1156 and cladding 1166 do not completely surround core 1146, and are not in contact with the mask layer.

FIGS. 12A-12D are block diagrams of examples of light routing circuits for μLED communication. The various circuits illustrate integrated waveguides on the substrate to terminate light externally. Multiple styles of attaching and fusion of layers are available.

System 1202 illustrates substrate 1212 with μLED 1222 (illustrated as it is sometimes referred to as uLED as a simplification instead of use of the Greek letter mu). μLED 1222 represents an array of micro-optical devices in substrate 1212. Waveguide 1242 represents a waveguide of a connector to interface with μLED 1222. In one example, waveguide 1242 includes a prism represented by surface 1232. Surface 1232 can direct the light from μLED 1222 to propagate through waveguide 1242.

System 1204 illustrates substrate 1214 with μLED 1224, which represents an array of micro-optical devices in substrate 1214. Waveguide 1244 represents a waveguide of a connector to interface with μLED 1224. In one example, waveguide 1244 includes a prism represented by surface 1234. Surface 1234 can direct the light from μLED 1224 to propagate through waveguide 1244. In one example, waveguide 1244 includes one or more lenses 1254 to collimate are direct the light through waveguide 1244. In one example, system 1204 includes lens 1252, either as part of the connector, or as a component that sits between the connector and μLED 1224.

System 1206 illustrates substrate 1216 with μLED 1226, which represents an array of micro-optical devices in substrate 1216. Waveguide 1246 represents a waveguide of a connector to interface with μLED 1226. In one example, waveguide 1246 includes a prism represented by surface 1236. In one example, surface 1236 can include lens 1262, to direct and collimate the light from μLED 1226 to propagate through waveguide 1246.

System 1208 illustrates substrate 1218 with μLED 1228, which represents an array of micro-optical devices in substrate 1218. Waveguide 1248 represents a waveguide of a connector to interface with μLED 1228. In one example, waveguide 1248 includes a prism represented by surface

1238. Surface 1238 can direct the light from μLED 1228 to propagate through waveguide 1248. In one example, waveguide 1248 represents a first waveguide, which directs light from μLED 1228 to fiber core 1270.

Figure 13A:
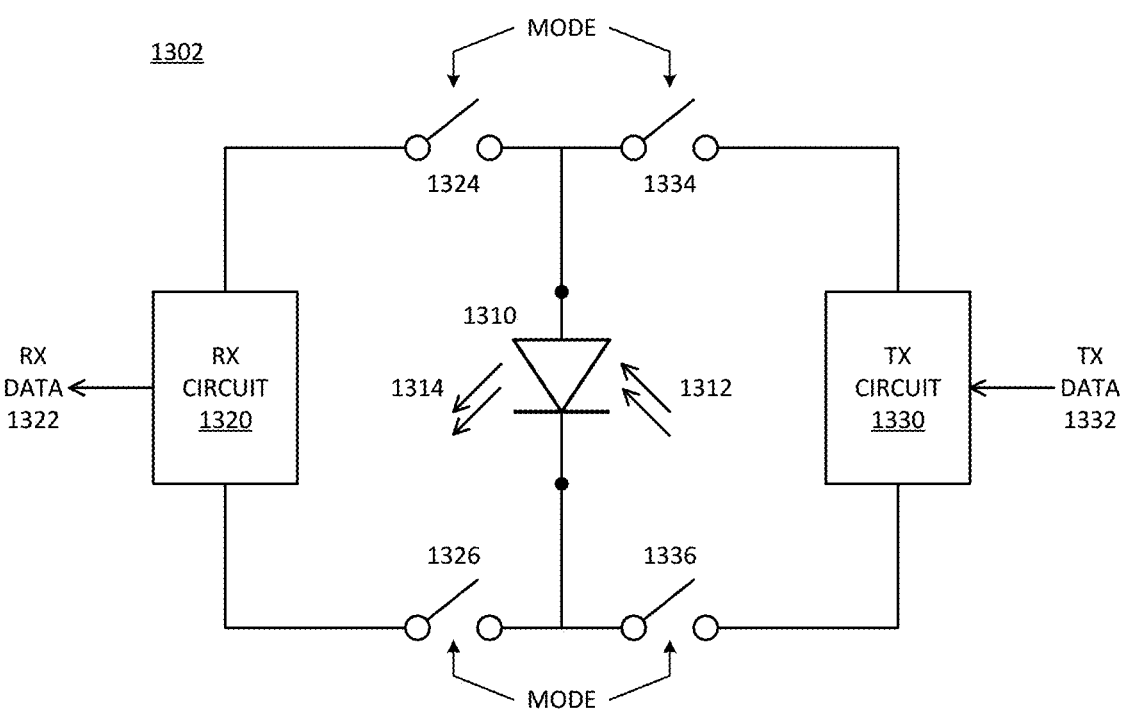
FIGS. 13A-13B are block diagrams of examples of bidirectional micro-LED circuits.
Figure 13B:
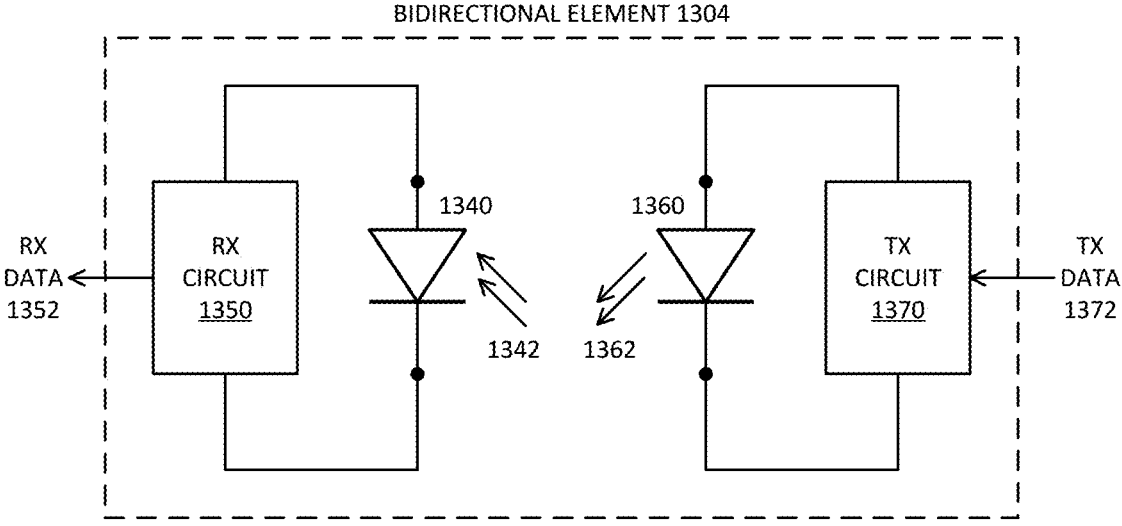

FIGS. 13A-13B are block diagrams of examples of bidirectional μLED circuits. In one example, a fiber bundle to transmit light between TX and RX sites of arrays of micro-optical devices includes a link training to automatically discover the topological connectivity between the two end points. In one example, the system includes bidirectional devices, which can operate as either transmitter or receiver of optical signals to enable realtime dynamic adjustment of the operation of the devices to ensure that a transmitter is paired with a receiver for each fiber core. The bidirectional device can have a light emitting operation to convert EIO to OIO for transmit, and a light detection operation to detect and convert OIO into EIO. A unified and bidirectional emitter/detector device can overcome alignment issues with cable manufacturing and assembly.

FIG. 13A illustrates an example circuit representation of a bidirectional μLED circuit where any photo-emitting diode is also a photo-detecting diode. Circuit 1302 includes diode 1310, which can emit light (optical signal 1314) or detect light (optical signal 1312). In one example, circuit 1302 includes switches to control the mode of the circuit, as the device can be an emitter or a receiver, but will only be one at a time.

For receive, switches 1334 and 1336 will remain open, while switches 1324 and 1326 will close. The closing of switches 1324 and 1326 connects diode 1310 to RX circuit 1320. In response to receiving optical signal 1312, diode 1310 will generate a current. RX circuit 1320 can amplify and process the current to generate RX data 1322 to provide to a processing element. RX circuit 1320 can generate a digital signal from the received current.

For transmit, switches 1324 and 1326 will remain open, while switches 1334 and 1336 will close. The closing of switches 1334 and 1336 connects diode 1310 to TX circuit 1330. TX circuit 1330 receives digital TX data 1332 and drives the LED, diode 1310, in response to the TX data. Diode 1310 generates optical signal 1314 in the form of light emitted from circuit 1302.

μLEDs can generate a light signal based on an input signal having a very low current, and thus, standard CMOS logic is capable of driving the transmitter function with a simple voltage amplifier or charge pump. TX circuit 1330 can include a voltage amplifier, charge pump, or other circuitry to drive diode 1310. The output of diode 1310 can be in the range of microamps (μA).

The input operation in response to optical signal 1312 typically results in a diode current in the range of nanoamps (nA). The low current makes the receive path of RX circuit 1320 more complex than the transmit path of TX circuit 1330, seeing RX circuit 1320 needs to detect the very small currents. RX circuit 1320 detects the currents, amplifies, and performs noise compensation to generate RX data 1322 from optical signal 1312.

FIG. 13B illustrates an example circuit representation of a bidirectional μLED circuit with two separate devices to allow each micro-device to have transmit and receive capability. The very small size of μLED devices means it could be simpler and more economical to use multiple devices in a "compound element" arrangement to enable bidirectional functionality.

Circuit 1304 includes a receive unit with diode 1340 and RX circuit 1350 and a transmit unit with diode 1360 and TX circuit 1370. Diode 1340 and diode 1360 are separately controllable to ensure only one is operating at a time.

For receive, diode 1340 receives optical signal 1342 and generates a current that RX circuit 1350 uses to generate RX data 1352. The components of RX circuit 1350 can be similar to those of RX circuit 1320 of circuit 1302, but diode 1340 can be engineered in a way to generate more current than diode 1310 in receive mode.

For transmit, TX circuit 1370 receives digital TX data 1372 and drives LED 1360 in response to the TX data. Diode 1360 generates optical signal 1362 in the form of light emitted from circuit 1304.

Bidirectional elements are contrasted with typical VCSEL and μLED implementations, which are TX-only devices, requiring PD sites with associated TIA (transimpedance amplifier) and noise suppression circuits, which increases circuit footprint. Repurposing μLED devices as photodetector diodes can simplify and enhance reliability features in the design.

Whether for circuit 1302 or circuit 1304, a bidirectional μLED element (whether a dual-mode LED or a compound device) allows any μLED site to be individually driven in either emitter or detector mode, but not both concurrently. The ability to switch modes can enable the recovery of an arbitrary fiber connectivity pattern within the waveguide bundle to be detected, corrected, and recovered between two endpoints.

In one example, the concept of a pixel described above, with multiple μLED elements used in combination to form a pixel, can be implemented with multiple bidirectional μLED elements, whether compound elements, or elements that have different modes. In an example where multiple μLED sites or μLED elements are used in combination for a pixel, the recovery of a fiber connectivity patterns may require a full per-pixel shifter configuration, allowing any output from one side to map to an arbitrary fiber and input on the other end.

In one example, an optical communication system implements a training phase to initiate a per-pixel transmit pattern on one end and all-pixel detection mode on the other end to find unique mappings. The transmission can be repeated from the other direction to ensure correct waveguide mapping. If each pixel "cell" is composed of multiple μLED bidirectional elements, further fault tolerance can be managed by controlling individual per-cell μLED activations for redundancy.

While a "full shifter" pixel crossbar would allow arbitrary remapping of I/O lines between end points, the time and power involved in training thousands of pixel lines could reduce the practicality of implementation. Dividing the pixel arrays into "sectors" and requiring the multi-waveguide fiber bundles to be implemented in "sectors" that are significantly smaller in diameter than the end point silicon sector size can simplify this shifter complexity and improve the practicality of implementation. The ability to configure the optical I/O mapping after connection of the connector would significantly simplify the manufacturing complexity, with higher precision applied for the placement of sub-strands of fibers, while larger bundles of the sub-strands can be placed with less precision, or placed randomly.

The ability to remap I/O can also enable shifting the communication path between two endpoints from bidirectional at half of the total bandwidth per direction, to an on-demand reconfiguration of an arbitrary amount of the total bandwidth allocated to either direction in arbitrary increments. The ability to allocate bandwidth increases architectural choices, system design flexibility, and the ability to dynamically handle faults for resilient communications.

Figure 14A:
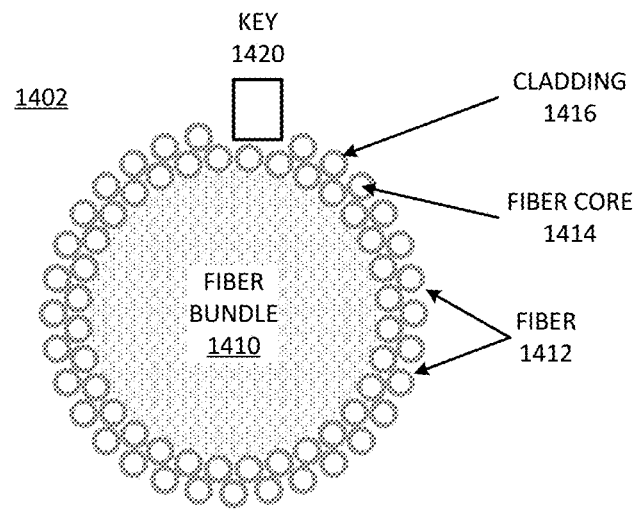
FIGS. 14A-14B are representations of micro-LED communication alignment.

FIG. 14A illustrates system 1402, which represents a fiber bundle for a micro-optical communication system in accordance with any example herein. Fiber bundle 1410 includes multiple fibers 1412, each having fiber core 1414 covered in cladding 1416. System 1402 only illustrates fibers 1412 on the outer edge of fiber bundle 1410. The gray area will also include fibers packed inside, where those fibers are not specifically illustrated. Fiber bundle 1410 can transmit optical signals between transmit and receive sites. In one example, system 1402 includes key 1420, which represents an alignment key. With the key aligned, in theory, the alignment of fibers 1412.

When working with small fiber counts as with traditional photonics (2-16 fibers), physical alignment keys and perfect fiber placement have a reasonable expectation of success. When the scale of fiber channels of multicore strands reaches number at O(100)-O(100,000) fibers, an alignment key may be ineffective to maintain alignment of all the fibers in the bundle. With the length of the fibers relative to the micro-scale of the diameter of the fibers, the amount of control required in manufacturing and assembly of many-core fiber bundles is very high to achieve a properly aligned fiber, resulting in increased cost for a properly aligned waveguide material.

In one example, the system lacks a physical alignment key for physical alignment and tolerance. Removing the physical alignment key runs the risk that the alignment of the fiber array can "rotate" on either end, resulting in a lack of mirror image fiber placement within bundles and connectors. When the cables cover both transmit and receive sites at each endpoint, the rotation could traditionally cause enough rotation that one endpoint's "transmit" lands on top of another endpoint's "transmit," resulting in a broken link.

Figure 14B:
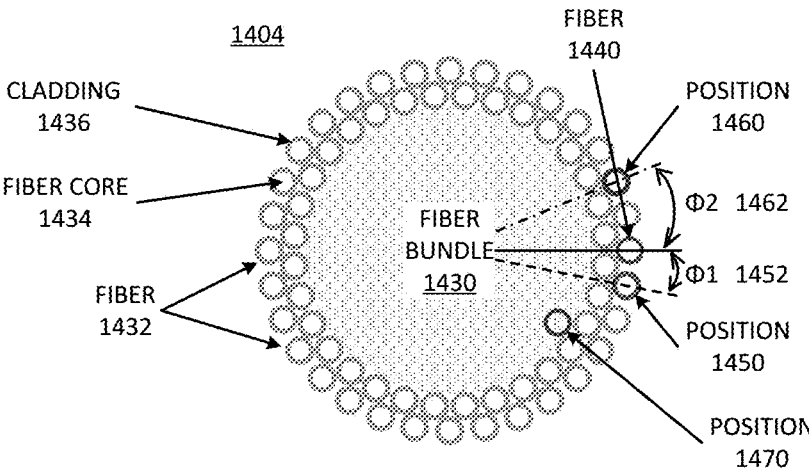

FIG. 14B illustrates system 1404, which represents a fiber bundle for a micro-optical communication system in accordance with any example herein. Fiber bundle 1430 includes multiple fibers 1432, each having fiber core 1434 covered in cladding 1436. System 1404 only illustrates fibers 1432 on the outer edge of fiber bundle 1430. The gray area will also include fibers packed inside, where those fibers are not specifically illustrated. Fiber bundle 1430 can transmit optical signals between transmit and receive sites.

In one example, system 1404 lacks an alignment key. System 1404 depicts rotation 1452, which is a free rotation of $\Phi1$ degrees of positive angular displacement, and rotation 1462, which is a free rotation of $\Phi2$ degrees of negative angular displacement. More specifically, system 1404 illustrates fiber 1440 with a darker circle. The solid line through fiber 1440 is a reference of angular rotation.

Fiber 1440 represents a starting position in fiber bundle 1430 at one end of a cable. Consider a first example where position 1450 represents an ending relative position of fiber 1440 in fiber bundle 1430 at the other end of the cable. Over the length of the cable, fiber 1440 would have rotated by $\Phi1$ degrees to position 1450. Consider a second example wherein position 1460 represents an ending relative position of fiber 1440 in fiber bundle 1430 at the other end of the cable. Over the length of the cable, fiber 1440 would have rotated by $\Phi2$ degrees to position 1460. Position 1450 and position 1460 represent simple rotations of fibers 1432 with the cable of fiber bundle 1430.

Consider a third example where position 1470 represents an ending relative position of fiber 1440 in fiber bundle 1430 at the other end of the cable. Such an example shows not just a rotation of the bundle within the cable from one end to another, but possible rotation and relatively random placement of fiber 1440 in fiber bundle 1430.

Despite lacking the physical alignment key, the cables with the fiber bundles can still achieve precise arrangements of fibers at each end to make an optical link. Typically, fibers on one connector are aligned in a "raster-scan" style from core 1 to N, and the exact same pattern (in reverse) exists on the connector at the other end of the waveguide. In the examples of system 1404, various types of free rotation error are illustrated (positive angular displacement, negative angular displacement, and random displacement). In one example, the optical communication system can tolerate the free rotation by compensating for the rotation or displacement with the use of bidirectional or multi-polarity elements at each optical device site.

The application of self-training with bidirectional devices allows for arbitrary mappings of fibers and devices. Thus, system 1404 can make proper optical links even if the relative position of fiber 1440 changes over the length of the cable to position 1450, position 1460, position 1470, or some other position. The self-training can detect what optical devices are aligned with fiber 1440 on each end, and configure TX and RX operation according to the mapping detected.

Figure 15A:
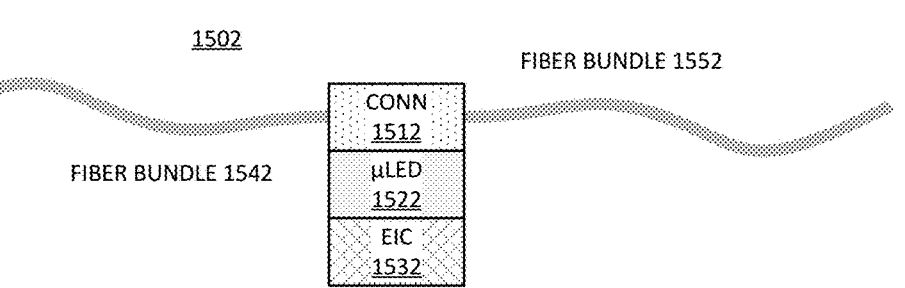
FIG. 15A is a block diagram of an example of a micro-LED repeater.

FIG. 15A is a block diagram of an example of a μLED repeater. System 1502 represents an optical communication system in accordance with any example herein. Fiber bundle 1542 represents a fiber bundle that connects to a first micro-optical array. Fiber bundle 1552 represents a fiber bundle that connects to a second micro-optical array. The use of micro-optical arrays may prevent sufficient reach of the signal between corresponding TX and RX sites.

System 1502 includes connector (CONN) 1512, which represents a connector or interface to fiber bundle 1542 and to fiber bundle 1552. Connector 1512 represents a connector layer of a repeater or re-timer/amplifier module. In one example, the module includes an array of μLEDs, represented by μLED 1522. In one example, the module includes EIC 1532 as an electrical control layer to receive the optical signals of fiber bundle 1542, convert them to EIO, convert them back to OIO, and send them on fiber bundle 1552. EIC 1532 enables the powered detection and retransmission of data. The retransmission of the data can include amplifying and re-timing the data signals. The same pattern can occur for signals from fiber bundle 1552 to fiber bundle 1542.

Current μLED technology appears to be capable of delivering approximately 3 dBm of optical link into a medium, which provides a link budget reach of less than 10 m with standard waveguides. Adding multiple connectors (e.g., 2-4) to the path can reduce the link budget reach to less than 3 m. As such, the reach is sufficient for board-level and rack-level data communications. The repeating of the optical signals can extend the application of micro-optics-based communication beyond rack-scale solutions.

In one example, instead of converting signals from OIO to OIO to pass between fiber bundles on each end, system 1502 can enable the converting of signals from OIO to EIO to transmit between electrical and optical domains. For example, the system could convert between optical signals and electrical ethernet packets.

Figure 15B:
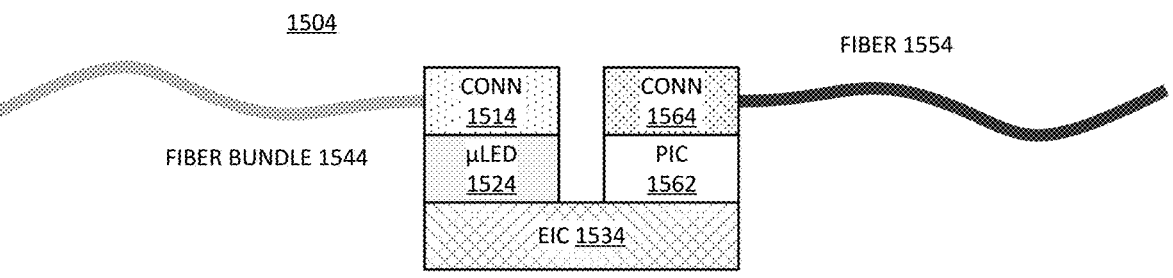
FIG. 15B is a block diagram of an example of a micro-LED to laser repeater.

FIG. 15B is a block diagram of an example of a μLED to laser repeater or optical bridge. System 1504 represents an optical communication system in accordance with any example herein. Fiber bundle 1544 represents a fiber bundle that connects to a micro-optical array. Fiber bundle 1552 represents a fiber bundle that connects to a laser transmitter/ receiver device. Thus, system 1504 converts between micro-optical communication and laser communication.

System 1504 includes connector (CONN) 1514, which represents a connector or interface to fiber bundle 1544. Connector 1514 represents a connector layer of a repeater module. In one example, the module includes an array of µLEDs, represented by µLED 1524. In one example, the module includes EIC 1534 as an electrical control layer to receive the optical signals of fiber bundle 1544, convert them to EIO, and pass them to PIC (photonic integrated circuit) 1562. PIC 1562 is coupled to connector (CONN) 1564, which represents a connector or interface to fiber 1554. Fiber 1554 may be a fiber bundle, or some other fiber consistent with the use of laser communication.

For transmission from the laser signals to micro-optical communication, system 1504 receives a laser signal on fiber 1554 at connector 1564. PIC 1562 converts the signal to an electrical signal, and EIC 1534 drives µLED 1524 based on the signal to provide a micro-optical OIO to transmit through connector 1514 to fiber bundle 1544.

In one example, a system can apply system 1502 for rack-to-rack and component-to-component communication. At a top of the rack (or bottom of the rack), system 1504 can be applied to convert micro-optical OIO into laser signals or electrical signals to communicate to another component. System 1504 enables the conversion between different communication formats.

Figure 16:
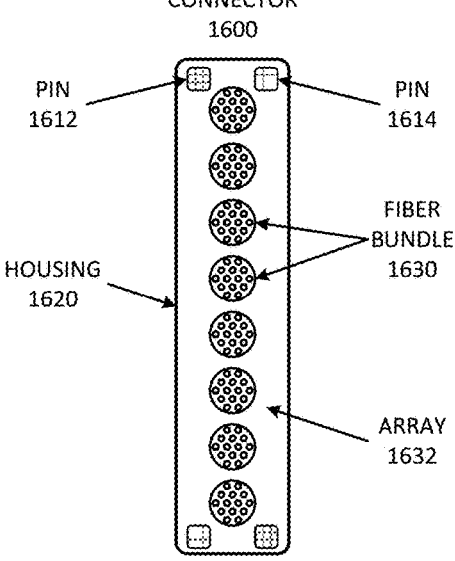
FIG. 16 is a block diagram of an example of a micro-LED connector with electrical contacts.

FIG. 16 is a block diagram of an example of a µLED connector with electrical contacts. Connector 1600 can apply to either system 1502 or system 1504. Whether a module is a repeater/re-timer for micro-optical communication, or whether the module is a bridge to a different communication format, the module placed to amplify the signal does know a priori the exact number of I/O "pins" that are in transmission, the total payload size, or which optical fibers align to which µLED devices. The application of self-training for auto-detection of signal configuration as described above can be applied in the context of repeaters and communication bridges.

To detect when the module should begin a training phase, connector 1600 can include pin 1612 and pin 1614, which represent electrical signals added to the waveguide bundles to trigger training. Thus, connector 1600 includes housing 1620 to house multiple fiber bundles 1630, which each correspond to an array of micro-optical devices represented by array 1632. Pin 1612 and pin 1614 are included within housing 1620.

In one example, the electrical pins are isolated areas with symmetry to allow arbitrary connection orientations. In one example, the electrical connections of pin 1612 and pin 1614 can be moved from the block connector (i.e., within housing 1620) to the actual waveguide bundles (i.e., within fiber bundles 1630). The electrical signals can trigger connectivity link training sequences. Thus, connector 1600 can allow the application of self-training to allow for the arbitrary alignment of multi-waveguide bundled cables and unknown numbers of "data pins" in the channel. Repeater modules and bridge modules can perform discovery of which fiber carries the 10 channel equivalent of data bit 0, which carries data bit 1, and so forth.

Figure 17:
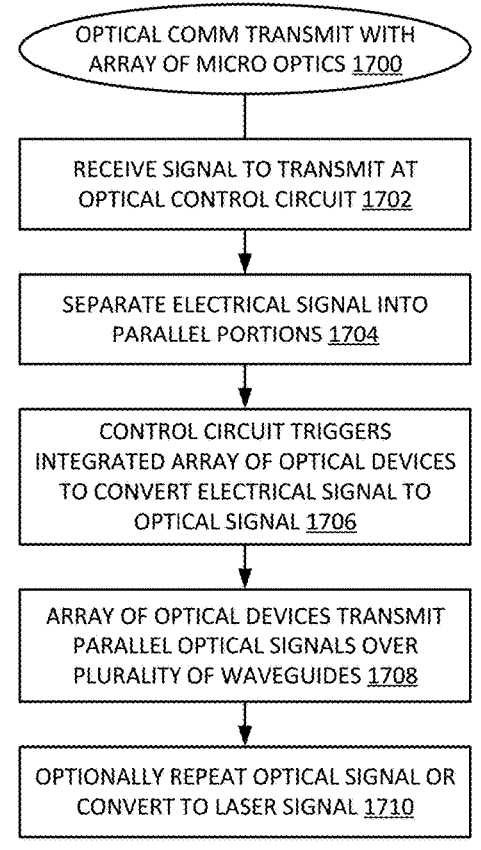
FIG. 17 is a flow diagram of an example of a process for optical communication transmitting with a micro optics array.

FIG. 17 is a flow diagram of an example of a process for optical communication transmitting with a micro optics array. Process 1700 represents a process for optical communication transmit from an array of micro-optical devices.

The electrical control circuit that controls the optical circuits receives an electrical signal to transmit, at 1702. In one example, the control circuit separates the electrical signal into parallel portions, to send different portions of the signal over different optical links, at 1704.

The control circuit can trigger integrated micro-optical devices to convert the electrical signal into an optical communication signal, at 1706. The micro-optical devices transmit the parallel optical signals over a plurality of waveguides, at 1708. The system can optionally include a repeater or a bridge to repeat the optical signal or convert the optical signal to a laser signal or an electrical signal, at 1710.

Figure 18:
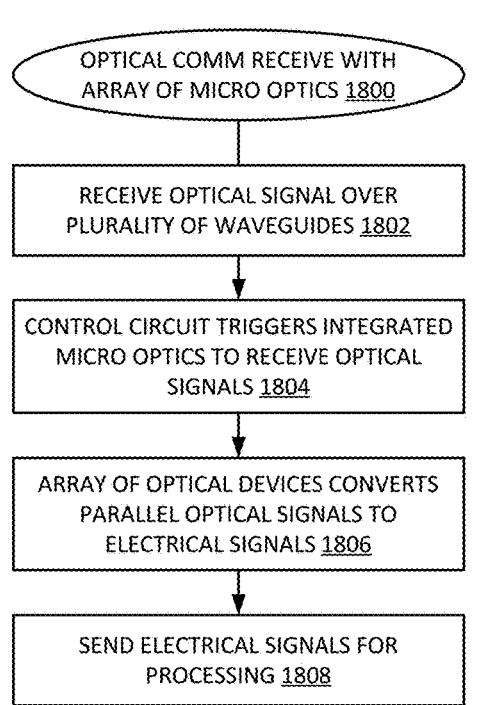
FIG. 18 is a flow diagram of an example of a process for optical communication receiving with a micro optics array.

FIG. 18 is a flow diagram of an example of a process for optical communication receiving with a micro optics array. Process 1800 represents a process for optical communication receive with an array of micro-optical devices.

A connector receives optical signals over a plurality of waveguides, at 1802. A control circuit that controls the operation of micro-optical devices can trigger the integrated micro-optical devices to receive the optical signals for detection, at 1804. The control circuit can trigger the micro-optical devices to convert parallel optical signals into electrical communication signals, at 1806. The micro-optical devices send the electrical signals for processing, at 1808.

Figure 19:
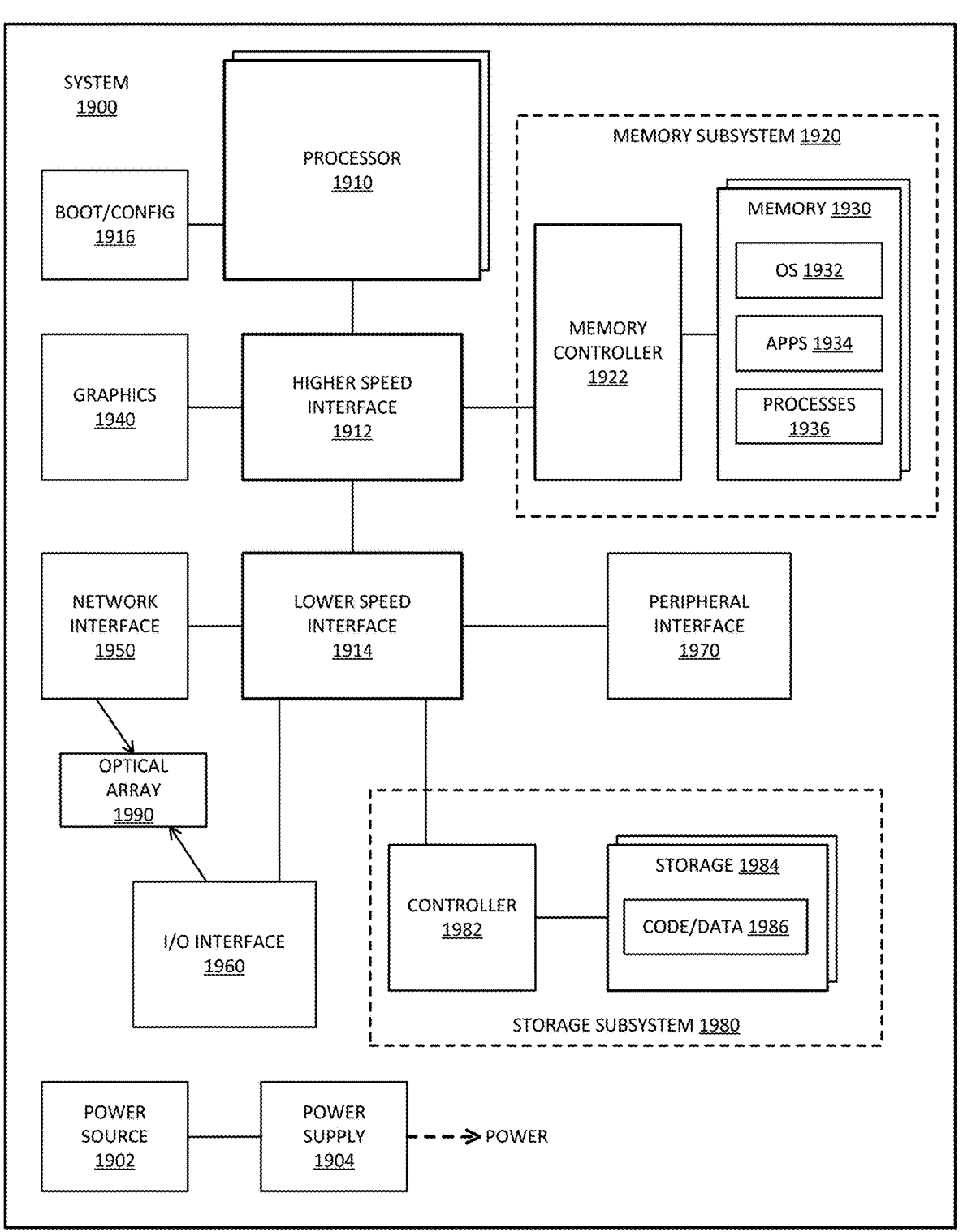
FIG. 19 is a block diagram of an example of a computing system in which micro-optics communication can be implemented.

FIG. 19 is a block diagram of an example of a computing system in which micro-optics communication can be implemented. System 1900 represents a computing device in accordance with any example herein, and can be a laptop computer, a desktop computer, a tablet computer, a server, a rack-based computing device, a gaming or entertainment control system, embedded computing device, or other electronic device.

In one example, system 1900 includes components for a micro-optical communication system in accordance with any example herein. uLED array 1990 represents a micro-LED array or other micro-optical array integrated into a component substrate, such as a communication component of I/O interface 1960 or network interface 1950. uLED array 1990 could alternatively be implemented in a communication component of peripheral interface 1970. uLED array 1990 enables optical communication in accordance with any example herein.

System 1900 includes processor 1910 can include any type of microprocessor, central processing unit (CPU), graphics processing unit (GPU), processing core, or other processing hardware, or a combination, to provide processing or execution of instructions for system 1900. Processor 1910 can be a host processor device. Processor 1910 controls the overall operation of system 1900, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1900 includes boot/config 1916, which represents storage to store boot code (e.g., basic input/output system (BIOS)), configuration settings, security hardware (e.g., trusted platform module (TPM)), or other system level hardware that operates outside of a host OS. Boot/config 1916 can include a nonvolatile storage device, such as read-only memory (ROM), flash memory, or other memory devices.

In one example, system 1900 includes interface 1912 coupled to processor 1910, which can represent a higher speed interface or a high throughput interface for system components that need higher bandwidth connections, such as memory subsystem 1920 or graphics interface components 1940. Interface 1912 represents an interface circuit, which can be a standalone component or integrated onto a processor die. Interface 1912 can be integrated as a circuit onto the processor die or integrated as a component on a system on a chip. Where present, graphics interface 1940 interfaces to graphics components for providing a visual display to a user of system 1900. Graphics interface 1940 can be a standalone component or integrated onto the processor die or system on a chip. In one example, graphics interface 1940 can drive a high definition (HD) display or ultra high definition (UHD) display that provides an output to a user. In one example, the display can include a touch-screen display. In one example, graphics interface 1940 generates a display based on data stored in memory 1930 or based on operations executed by processor 1910 or both.

Memory subsystem 1920 represents the main memory of system 1900, and provides storage for code to be executed by processor 1910, or data values to be used in executing a routine. Memory subsystem 1920 can include one or more varieties of random-access memory (RAM) such as DRAM, 3DXP (three-dimensional crosspoint), or other memory devices, or a combination of such devices. Memory 1930 stores and hosts, among other things, operating system (OS) 1932 to provide a software platform for execution of instructions in system 1900. Additionally, applications 1934 can execute on the software platform of OS 1932 from memory 1930. Applications 1934 represent programs that have their own operational logic to perform execution of one or more functions. Processes 1936 represent agents or routines that provide auxiliary functions to OS 1932 or one or more applications 1934 or a combination. OS 1932, applications 1934, and processes 1936 provide software logic to provide functions for system 1900. In one example, memory subsystem 1920 includes memory controller 1922, which is a memory controller to generate and issue commands to memory 1930. It will be understood that memory controller 1922 could be a physical part of processor 1910 or a physical part of interface 1912. For example, memory controller 1922 can be an integrated memory controller, integrated onto a circuit with processor 1910, such as integrated onto the processor die or a system on a chip.

While not specifically illustrated, it will be understood that system 1900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1900 includes interface 1914, which can be coupled to interface 1912. Interface 1914 can be a lower speed interface than interface 1912. In one example, interface 1914 represents an interface circuit, which can include standalone components and integrated circuitry. In one example, multiple user interface components or peripheral components, or both, couple to interface 1914. Network interface 1950 provides system 1900 the ability to communicate with remote devices (e.g., servers or other computing devices) over one or more networks. Network interface 1950 can include an Ethernet adapter, wireless interconnection components, cellular network interconnection components, USB (universal serial bus), or other wired or wireless standards-based or proprietary interfaces. Network interface 1950 can exchange data with a remote device, which can include sending data stored in memory or receiving data to be stored in memory.

In one example, system 1900 includes one or more input/output (I/O) interface(s) 1960. I/O interface 1960 can include one or more interface components through which a user interacts with system 1900 (e.g., audio, alphanumeric, tactile/touch, or other interfacing). Peripheral interface 1970 can include any hardware interface not specifically mentioned above. Peripherals refer generally to devices that connect dependently to system 1900. A dependent connection is one where system 1900 provides the software platform or hardware platform or both on which operation executes, and with which a user interacts.

In one example, system 1900 includes storage subsystem 1980 to store data in a nonvolatile manner. In one example, in certain system implementations, at least certain components of storage 1980 can overlap with components of memory subsystem 1920. Storage subsystem 1980 includes storage device(s) 1984, which can be or include any conventional medium for storing large amounts of data in a nonvolatile manner, such as one or more magnetic, solid state, NAND, 3DXP, or optical based disks, or a combination. Storage 1984 holds code or instructions and data 1986 in a persistent state (i.e., the value is retained despite interruption of power to system 1900). Storage 1984 can be generically considered to be a "memory," although memory 1930 is typically the executing or operating memory to provide instructions to processor 1910. Whereas storage 1984 is nonvolatile, memory 1930 can include volatile memory (i.e., the value or state of the data is indeterminate if power is interrupted to system 1900). In one example, storage subsystem 1980 includes controller 1982 to interface with storage 1984. In one example controller 1982 is a physical part of interface 1914 or processor 1910, or can include circuits or logic in both processor 1910 and interface 1914.

Power source 1902 provides power to the components of system 1900. More specifically, power source 1902 typically interfaces to one or multiple power supplies 1904 in system 1900 to provide power to the components of system 1900. In one example, power supply 1904 includes an AC to DC (alternating current to direct current) adapter to plug into a wall outlet. Such AC power can be renewable energy (e.g., solar power) power source 1902. In one example, power source 1902 includes a DC power source, such as an external AC to DC converter. In one example, power source 1902 or power supply 1904 includes wireless charging hardware to charge via proximity to a charging field. In one example, power source 1902 can include an internal battery or fuel cell source.

Figure 20:
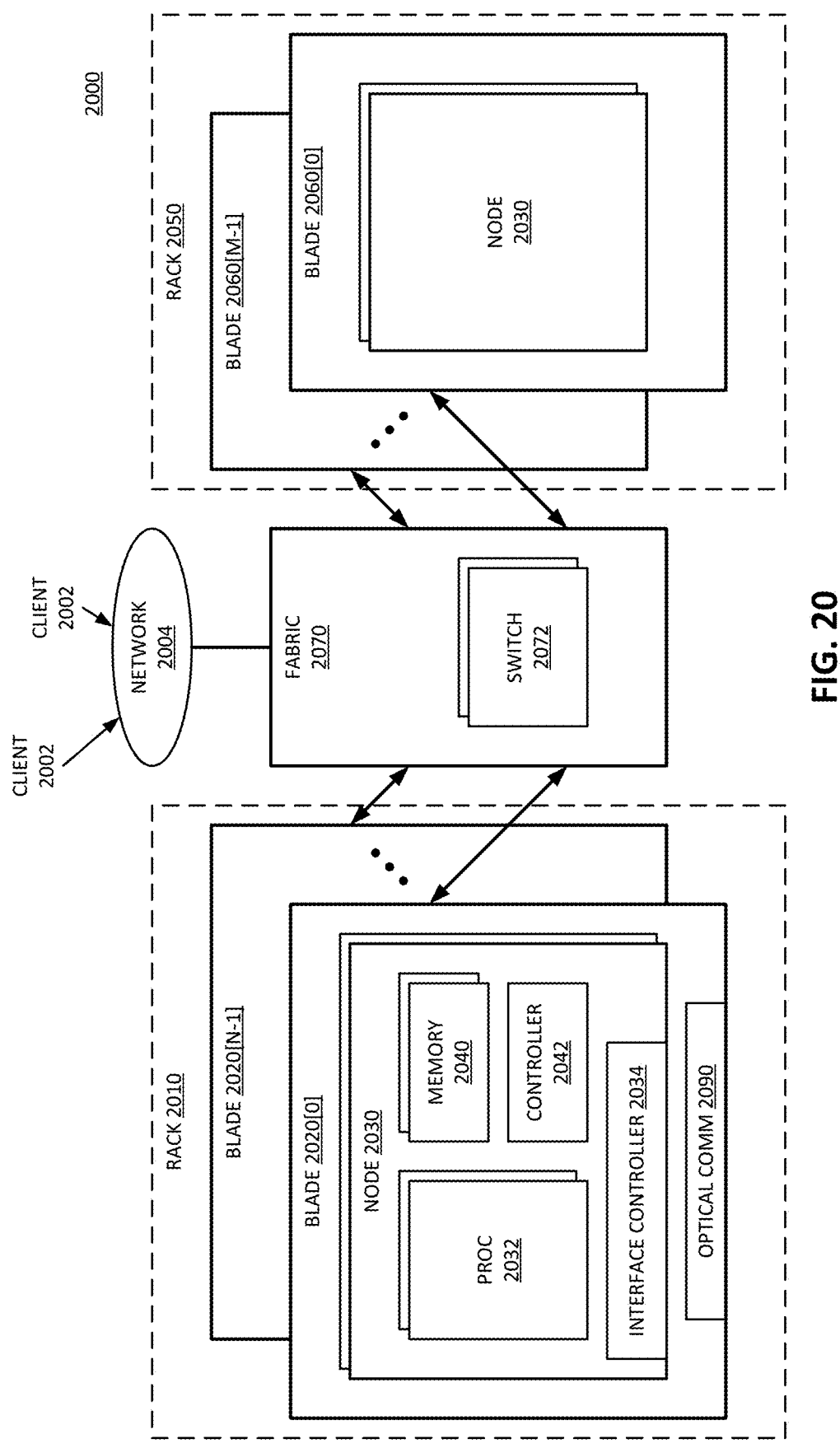
FIG. 20 is a block diagram of an example of a multi-node network in which micro-optics communication can be implemented.

FIG. 20 is a block diagram of an example of a multi-node network in which micro-optics communication can be implemented. System 2000 represents a network of nodes. In one example, system 2000 represents a data center. In one example, system 2000 represents a server farm. In one example, system 2000 represents a data cloud or a processing cloud.

Node 2030 represents a computing device of blade 2020 [0] in system 2000. In one example, blade 2020[0] includes micro-optical communication capability in accordance with any example herein. Optical communication (COMM) 2090 represents components for micro-optical communication, such as a micro-LED array or other micro-optical array integrated into a component substrate, and a plurality of waveguides to transmit optical signals between TX and RX sites.

One or more clients 2002 make requests over network 2004 to system 2000. Network 2004 represents one or more local networks, or wide area networks, or a combination. Clients 2002 can be human or machine clients, which generate requests for the execution of operations by system 2000. System 2000 executes applications or data computation tasks requested by clients 2002.

In one example, system 2000 includes one or more racks, which represent structural and interconnect resources to house and interconnect multiple computation nodes. In one example, rack 2OIO includes multiple nodes 2030. In one example, rack 2OIO hosts multiple blade components 2020. Hosting refers to providing power, structural or mechanical support, and interconnection. Blades 2020 can refer to computing resources on printed circuit boards (PCBs), where a PCB houses the hardware components for one or more nodes 2030. In one example, blades 2020 do not include a chassis or housing or other "box" other than that provided by rack 2OIO. In one example, blades 2020 include housing with exposed connector to connect into rack 2OIO. In one example, system 2000 does not include rack 2OIO, and each blade 2020 includes a chassis or housing that can stack or otherwise reside in close proximity to other blades and allow interconnection of nodes 2030.

System 2000 includes fabric 2070, which represents one or more interconnectors for nodes 2030. In one example, fabric 2070 includes multiple switches 2072 or routers or other hardware to route signals among nodes 2030. Additionally, fabric 2070 can couple system 2000 to network 2004 for access by clients 2002. In addition to routing equipment, fabric 2070 can be considered to include the cables or ports or other hardware equipment to couple nodes 2030 together. In one example, fabric 2070 has one or more associated protocols to manage the routing of signals through system 2000. In one example, the protocol or protocols is at least partly dependent on the hardware equipment used in system 2000.

As illustrated, rack 2OIO includes N blades 2020. In one example, in addition to rack 2OIO, system 2000 includes rack 2050. As illustrated, rack 2050 includes M blades 2060. M is not necessarily the same as N; thus, it will be understood that various different hardware equipment components could be used, and coupled together into system 2000 over fabric 2070. Blades 2060 can be the same or similar to blades 2020. Nodes 2030 can be any type of node and are not necessarily all the same type of node. System 2000 is not limited to being homogenous, nor is it limited to not being homogenous.

For simplicity, only the node in blade 2020[0] is illustrated in detail. However, other nodes in system 2000 can be the same or similar. At least some nodes 2030 are computation nodes, with processor (proc) 2032 and memory 2040. A computation node refers to a node with processing resources (e.g., one or more processors) that executes an operating system and can receive and process one or more tasks. In one example, at least some nodes 2030 are server nodes with a server as processing resources represented by processor 2032 and memory 2040. A storage server refers to a node with more storage resources than a computation node, and rather than having processors for the execution of tasks, a storage server includes processing resources to manage access to the storage nodes within the storage server.

In one example, node 2030 includes interface controller 2034, which represents logic to control access by node 2030 to fabric 2070. The logic can include hardware resources to interconnect to the physical interconnection hardware. The logic can include software or firmware logic to manage the interconnection. In one example, interface controller 2034 is or includes a host fabric interface, which can be a fabric interface in accordance with any example described herein.

Processor 2032 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 2040 can be or include memory devices represented by memory 2040 and a memory controller represented by controller 2042.

Figure 21:
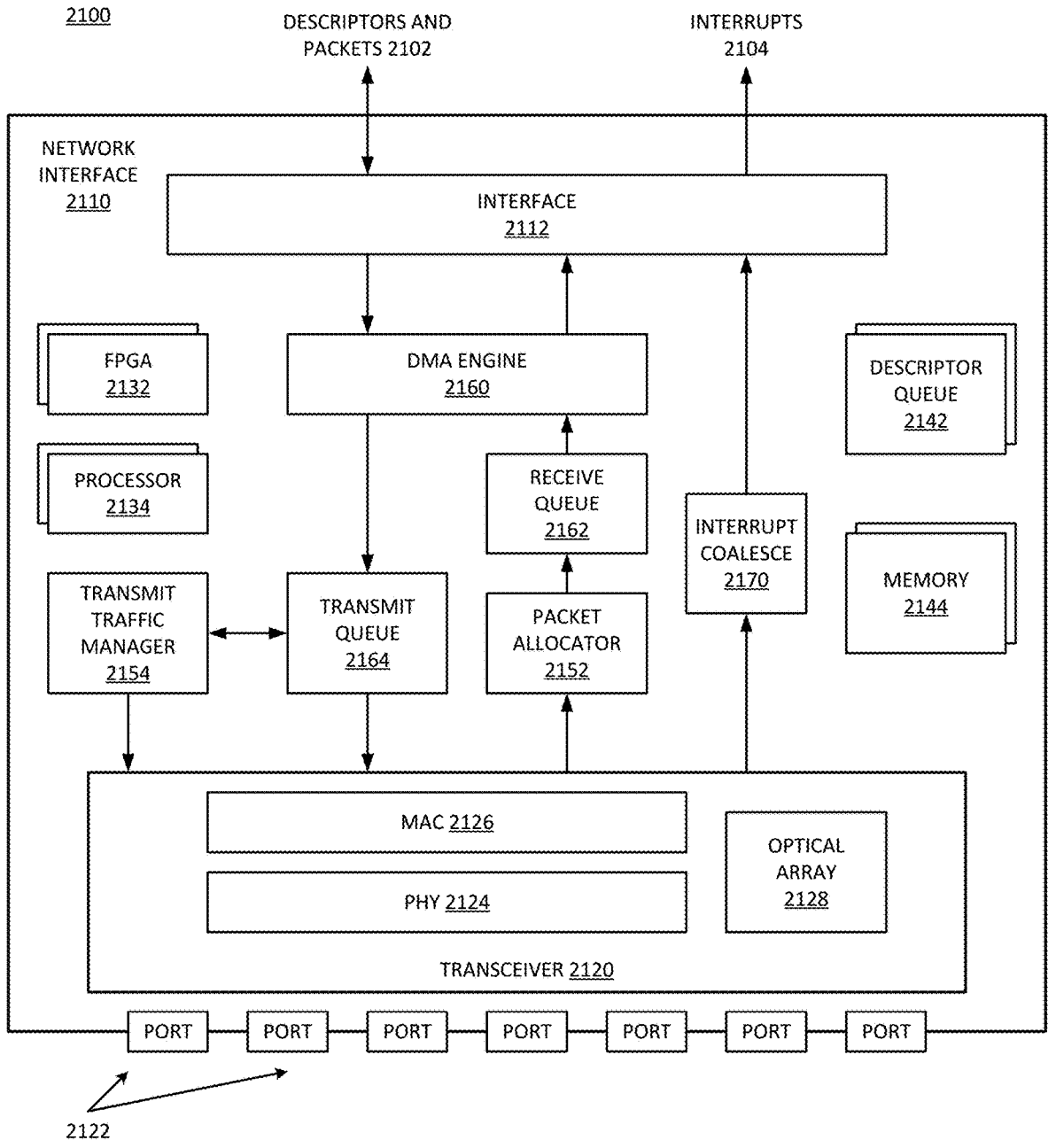
FIG. 21 is a block diagram of an example of a network interface device.

FIG. 21 is a block diagram of an example of a network interface device. Various hardware and software resources in the network interface can be configured to perform optical communication with an array of optical devices to interface with a connector having multiple waveguides, as described herein. System 2100 includes network interface 2110, which can be a standalone device or chip, or can be a circuit integrated into a processor or control substrate. In some examples, network interface 2110 can be implemented as a network interface controller, network interface card, a host fabric interface (HFI), or host bus adapter (HBA), and such examples can be interchangeable. network interface 2110 can be coupled to one or more servers using a bus, PCIe, CXL, or DDR. Network interface 2110 can be embodied as part of a system-on-a-chip (SoC) that includes one or more processors, or included on a multichip package that also contains one or more processors.

Some examples of network interface 2110 are part of an infrastructure processing unit (IPU) or data processing unit (DPU) or utilized by an IPU or DPU. An xPU can refer at least to an IPU, DPU, GPU, GPGPU (general purpose graphics processing unit), or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 2110 can include transceiver 2120, processors 2134, transmit queue 2164, receive queue 2162, memory 2144, bus interface 2112, and DMA (direct memory access) engine 2160. Transceiver 2120 can be capable of receiving and transmitting packets in conformance with applicable protocols such as Ethernet as described in IEEE 802.3, although other protocols can be used. Transceiver 2120 can receive and transmit packets from and to a network via a network medium (not depicted) via ports 2122. Ports 2122 can interface to connectors that transmit networks signals via the network medium. Transceiver 2120 can include physical layer circuitry (PHY) 2124 and media access control circuitry (MAC) 2126. PHY 2124 can include encoding and decoding circuitry (not shown) to encode and decode data packets according to applicable physical layer specifications or standards. MAC 2126 can be configured to perform MAC address filtering on received packets, process MAC headers of received packets by verifying data integrity, remove preambles and padding, and provide packet content for processing by higher layers. MAC 2126 can be configured to assemble data to be transmitted into packets.

Processors 2134 can be any a combination of: a processor, processing core, graphics processing unit (GPU), field programmable gate array (FPGA) 2132, application specific integrated circuit (ASIC), or other programmable hardware device that allows programming of network interface 2110. For example, a "smart network interface" or SmartNIC can provide packet processing capabilities in the network interface using processors 2134.

Processors 2134 can include a programmable processing pipeline that is programmable by P4, C, Python, Broadcom Network Programming Language (NPL), NVIDIA® CUDA®, NVIDIA® DOCA™, or x86 compatible executable binaries or other executable binaries. A programmable processing pipeline can include one or more match-action units (MAUs) that can schedule packets for transmission. Processors, FPGAs, other specialized processors, controllers, devices, or other circuits, or a combination can be used utilized for packet processing or packet modification. Ternary content-addressable memory (TCAM) can be used for parallel match-action or look-up operations on packet header content.

Packet allocator 2152 can provide distribution of received packets for processing by multiple CPUs or cores using receive side scaling (RSS). When packet allocator 2152 uses RSS, packet allocator 2152 can calculate a hash or make another determination based on contents of a received packet to determine which CPU or core is to process a packet.

Interrupt coalesce 2170 can perform interrupt moderation whereby network interface interrupt coalesce 2170 waits for multiple packets to arrive, or for a timeout to expire, before generating an interrupt to the host to process received packet(s). Interrupts 2104 represent the interrupts provided to the host. Receive segment coalescing (RSC) can be performed by network interface 2110 whereby portions of incoming packets are combined into segments of a packet. Network interface 2110 provides this coalesced packet to an application.

DMA engine 2160 can copy a packet header, packet payload, and/or descriptor directly from host memory to the network interface or vice versa, instead of copying the packet to an intermediate buffer at the host and then using another copy operation from the intermediate buffer to the destination buffer. Descriptors and packets 2102 represent packets and descriptors to be provided to the host (e.g., host memory or host processor) for network receive operation, or packets and descriptors from the host to use for network transmit operation.

Memory 2144 can be any type of volatile or nonvolatile memory device and can store any queue or instructions used to program network interface 2110. Transmit queue 2164 can include data or references to data for transmission by transceiver 2120. Transmit traffic manager 2154 can manage the transmission of packets from transmit queue 2164 to transceiver 2120. Receive queue 2162 can include data or references to data that was received by transceiver 2120 from a network. Descriptor queues 2142 can include descriptors that reference data or packets in transmit queue 2164 or receive queue 2162. Bus interface 2112 can provide an interface with the host (not depicted). For example, bus interface 2112 can be compatible with or based at least in part on PCI, PCI Express, PCI-x, Serial ATA, and/or USB (although other interconnection standards may be used), or proprietary variations thereof.

In one example, transceiver 2120 includes optical array 2128, to perform optical signal transmit and optical signal receive as described herein. Optical array 2128 can include micro-scale optical devices for conversion of EIO to OIO for transmit, and from OIO to EIO for receive. While illustrated in transceiver 2120, optical array 2128 can be implemented as a circuit array in any chip within network interface 2110.

Figure 22:
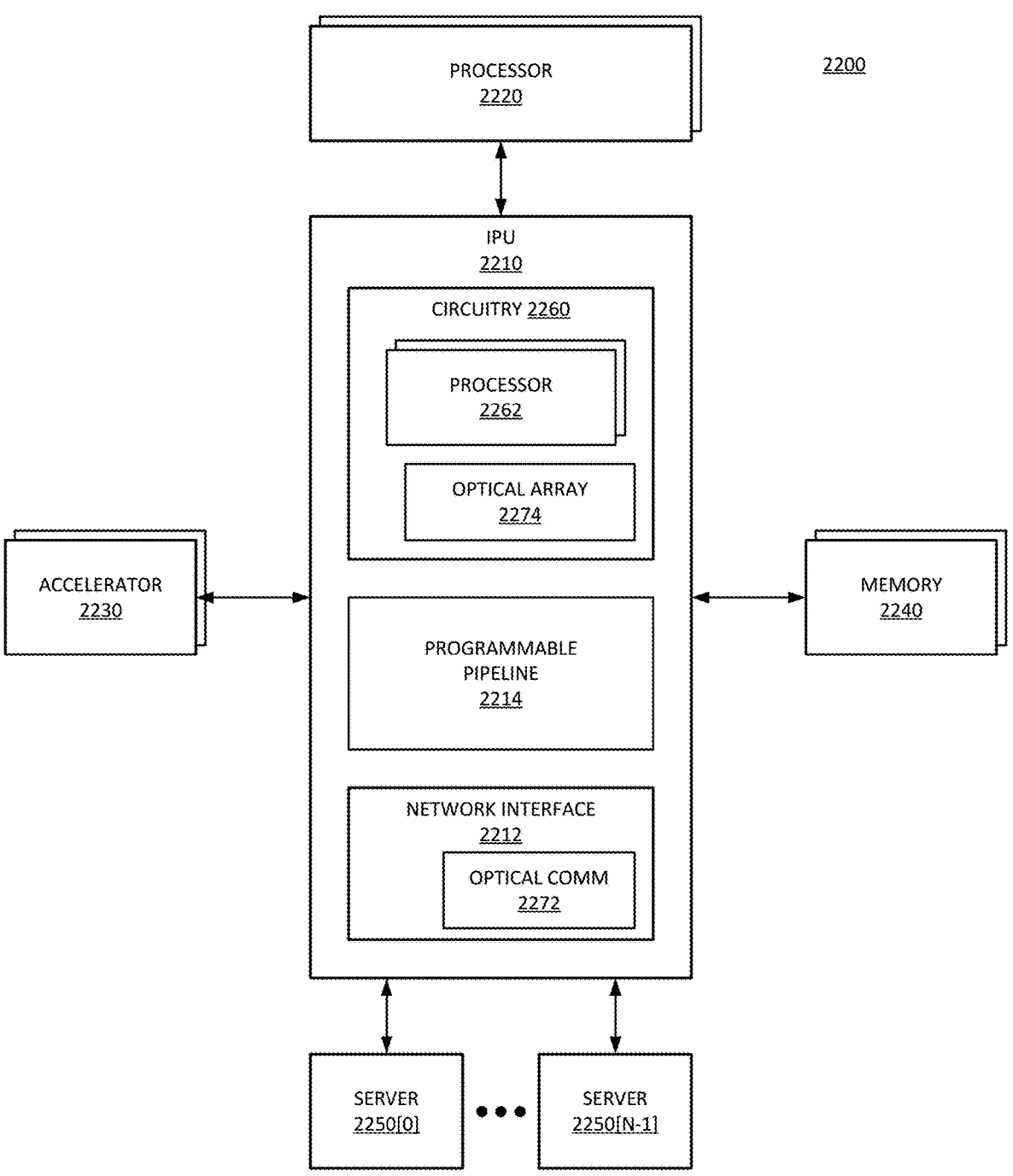
FIG. 22 is a block diagram of an example of a system with a network interface device.

FIG. 22 is a block diagram of an example of a system with a network interface device. System 2200 includes IPU (infrastructure processing unit) 2210 to provide processing and network interconnection. IPU 2210 includes circuitry 2260, which can include processors 2262 and one or more control circuits, such as circuits to control network interconnection operation.

In system 2200, IPU 2210 manages performance of one or more processes using one or more of processors 2262, processors 2220, accelerators 2230, memory 2240, or servers 2250[0:N-1], collectively, servers 2250, where N is an integer of 1 or more. Memory 2240 can represent a memory pool, having one or more memory devices that can be shared among one or more components of system 2200. In some examples, processor 2262 can execute one or more processes, applications, VMs (virtual machines), containers, microservices, and so forth, which request performance of workloads by one or more of: processors 2220, accelerators 2230, memory 2240, or servers 2250, or a combination of these.

IPU 2210 can utilize network interface 2212 or one or more device interfaces to communicate with processors 2220, accelerators 2230, memory 2240, and/or servers 2250. IPU 2210 can utilize programmable pipeline 2214 to process packets that are to be transmitted from network interface 2212 or packets received from network interface 2212. Network interface 2212 can provide optical communication (COMM) 2272 with multiple optical waveguides to interconnect an array of optical devices as described herein. In one example, a substrate of a chip of network interface 2212 or a substrate of a chip of circuitry 2260, such as one or more processor 2262, can include the array of optical devices. In one example, optical array 2274 represents the array of optical devices in circuitry 2260, which can provide optical communication directly from a chip in IPU 2210.

In a first example, an apparatus includes: a substrate having an array of micro-scale optical sources integrated into the substrate; and a controller to drive the array of micro-scale optical sources with electrical communication signals; wherein the micro-scale optical sources are to convert the electrical communication signals into optical signals to transmit on a plurality of optical waveguides.

In a second example in accordance with the first example of the apparatus, the optical sources comprise micro-LEDs (light emitting diodes).

In a third example in accordance with any preceding example of the apparatus, the micro-LEDs comprise nanowire LEDs.

In a fourth example in accordance with any preceding example of the apparatus, each micro-LED comprises an array of separately controllable nanowires.

In a fifth example in accordance with any preceding example of the apparatus, the micro-scale optical sources comprise optical devices each having a footprint on the substrate of approximately less than 10 square microns (10 $\mu m^2$).

In a sixth example in accordance with any preceding example of the apparatus, the optical sources comprise micro-scale vertical cavity surface emitting lasers (VCSELs).

In a seventh example in accordance with any preceding example of the apparatus, the optical sources comprise bidirectional devices having a light emitting operation and a light detection operation.

In an eighth example in accordance with any preceding example of the apparatus, the plurality of optical waveguides comprises an optical fiber bundle.

In a ninth example in accordance with any preceding example of the apparatus, the optical fiber bundle includes multiple fiber cores to receive optical signals per optical source.

In a tenth example in accordance with any preceding example of the apparatus, the optical fiber bundle includes fiber cores to receive optical signals from multiple optical sources.

In an eleventh example in accordance with any preceding example of the apparatus, the optical fiber bundle includes a fiber core to transmit optical signals of different wavelengths.

In a twelfth example in accordance with any preceding example of the apparatus, the micro-scale optical sources include transmit optical sources to convert the electrical communication signals into optical signals and receive optical devices to receive input optical signals on the plurality of optical waveguides and convert the input optical signals into input electrical communication signals, and further comprising: a connector to house the optical fiber bundle to transmit the optical signals between the transmit optical sources and corresponding receive optical devices.

In a thirteenth example in accordance with any preceding example of the apparatus, the connector includes an alignment key to align fiber cores of the optical fiber bundle with the transmit optical sources and the receive optical sources.

In a fourteenth example in accordance with any preceding example of the apparatus, the controller is to generate control signals to implement optical signal training to adjust for alignment between fiber cores of the optical fiber bundle and the plurality of optical sources.

In a fifteenth example in accordance with any preceding example of the apparatus, the connector is to connect to an optical signal repeater to amplify and re-time the optical signals.

In a sixteenth example in accordance with any preceding example of the apparatus, the optical sources comprise micro-LEDs, and wherein the connector is to connect to an optical signal converter to convert the optical signals into laser-light optical signals.

In a seventeenth example in accordance with any preceding example of the apparatus, the apparatus includes: electrical signal lines to trigger signal training of the optical signals to an optical signal repeater or an optical signal converter.

In an eighteenth example in accordance with any preceding example of the apparatus, the apparatus includes: a connector interface to interface to the connector vertically from a surface of the substrate.

In a nineteenth example in accordance with any preceding example of the apparatus, the apparatus includes: a connector interface to interface to the connector horizontally from a surface of the substrate.

In a twentieth example, a system includes: an integrated circuit chip having an array of micro-scale optical sources integrated into the computer chip and a control circuit to drive the array of micro-scale optical sources with electrical communication signals to trigger the optical sources to convert the electrical communication signals into optical signals; and a connector to interface the optical sources to a plurality of optical fibers of an optical fiber bundle.

In a twenty-first example in accordance with the example of the twentieth example, the optical sources comprise micro-LEDs (light emitting diodes).

In a twenty-second example in accordance with any preceding example of the system, the micro-LEDs comprise nanowire LEDs.

In a twenty-third example in accordance with any preceding example of the system, each micro-LED comprises an array of separately controllable nanowires.

In a twenty-fourth example in accordance with any preceding example of the system, the micro-scale optical sources comprise optical devices each having a footprint on the substrate of approximately less than 10 square microns (10 $\mu m^2$).

In a twenty-fifth example in accordance with any preceding example of the system, the optical sources comprise micro-scale vertical cavity surface emitting lasers (VC-SELs).

In a twenty-sixth example in accordance with any preceding example of the system, the optical sources comprise bidirectional devices having a light emitting operation and a light detection operation.

In a twenty-seventh example in accordance with any preceding example of the system, the optical fiber bundle includes multiple fiber cores to receive optical signals per optical source.

In a twenty-eighth example in accordance with any preceding example of the system, the optical fiber bundle includes fiber cores to receive optical signals from multiple optical sources.

In a twenty-ninth example in accordance with any preceding example of the system, the optical fiber bundle includes a fiber core to transmit optical signals of different wavelengths.

In a thirtieth example in accordance with any preceding example of the system, the micro-scale optical sources include transmit optical sources to convert the electrical communication signals into optical signals and receive optical devices to receive input optical signals on the plurality of optical waveguides and convert the input optical signals into input electrical communication signals, and wherein the connector is to house the optical fiber bundle to transmit the optical signals between the transmit optical sources and corresponding receive optical devices.

In a thirty-first example in accordance with any preceding example of the system, the connector includes an alignment key to align fiber cores of the optical fiber bundle with the transmit optical sources and the receive optical sources.

In a thirty-second example in accordance with any preceding example of the system, the controller is to generate control signals to implement optical signal training to adjust for alignment between fiber cores of the optical fiber bundle and the plurality of optical sources.

In a thirty-third example in accordance with any preceding example of the system, the connector is to connect to an optical signal repeater to amplify and re-time the optical signals.

In a thirty-fourth example in accordance with any preceding example of the system, the optical sources comprise micro-LEDs, and wherein the connector is to connect to an optical signal converter to convert the optical signals into laser-light optical signals.

In a thirty-fifth example in accordance with any preceding example of the system, the apparatus includes electrical signal lines to trigger signal training of the optical signals to an optical signal repeater or an optical signal converter.

In a thirty-sixth example in accordance with any preceding example of the system, the connector is to interface vertically from a surface of the substrate.

In a thirty-seventh example in accordance with any preceding example of the system, the connector is to interface to the connector horizontally from a surface of the substrate.

In a thirty-eighth example, a system includes: a fiber bundle including a plurality of optical fibers to connect to a connector, the connector to interface with an array of micro-scale optical sources integrated into a substrate, the array of micro-scale optical sources to convert electrical communication signals into optical signals; and an optical signal repeater to amplify and re-time the optical signals.

In a thirty-ninth example in accordance with the thirty-eighth example, the optical sources comprise micro-LEDs (light emitting diodes).

In a fortieth example in accordance with any of the thirty-eighth to the thirty-ninth examples, the micro-LEDs comprise nanowire LEDs.

In a forty-first example in accordance with any of the thirty-eighth to the fortieth examples, each micro-LED comprises an array of separately controllable nanowires.

In a forty-second example in accordance with any of the thirty-eighth to the forty-first examples, the micro-scale optical sources comprise optical devices each having a footprint on the substrate of approximately less than 10 square microns (10 $\mu m^2$).

In a forty-third example in accordance with any of the thirty-eighth to the forty-second examples, the optical sources comprise micro-scale vertical cavity surface emitting lasers (VCSELs).

In a forty-fourth example in accordance with any of the thirty-eighth to the forty-third examples, the optical sources comprise bidirectional devices having a light emitting operation and a light detection operation.

In a forty-fifth example in accordance with any of the thirty-eighth to the forty-fourth examples, the optical fiber bundle includes multiple fiber cores to receive optical signals per optical source.

In a forty-sixth example in accordance with any of the thirty-eighth to the forty-fifth examples, the optical fiber bundle includes fiber cores to receive optical signals from multiple optical sources.

In a forty-seventh example in accordance with any of the thirty-eighth to the forty-sixth examples, the optical fiber bundle includes a fiber core to transmit optical signals of different wavelengths.

In a forty-eighth example in accordance with any of the thirty-eighth to the forty-seventh examples, the micro-scale optical sources include transmit optical sources to convert the electrical communication signals into optical signals and receive optical devices to receive input optical signals on the plurality of optical waveguides and convert the input optical signals into input electrical communication signals, and further comprising: a connector to house the optical fiber bundle to transmit the optical signals between the transmit optical sources and corresponding receive optical devices.

In a forty-ninth example in accordance with any of the thirty-eighth to the forty-eighth examples, the connector includes an alignment key to align fiber cores of the optical fiber bundle with the transmit optical sources and the receive optical sources.

In a fiftieth example in accordance with any of the thirty-eighth to the forty-ninth examples, the controller is to generate control signals to implement optical signal training to adjust for alignment between fiber cores of the optical fiber bundle and the plurality of optical sources.

In a fifty-first example in accordance with any of the thirty-eighth to the fiftieth examples, the optical sources comprise micro-LEDs, and wherein the connector is to connect to an optical signal converter to convert the optical signals into laser-light optical signals.

In a fifty-second example in accordance with any of the thirty-eighth to the fifty-first examples, of claim 12, the system includes electrical signal lines to trigger signal training of the optical signals to an optical signal repeater or an optical signal converter.

In a fifty-third example in accordance with any of the thirty-eighth to the fifty-second examples, the system includes a connector interface to interface to the connector vertically from a surface of the substrate.

In a fifty-fourth example in accordance with any of the thirty-eighth to the fifty-third examples, the system includes a connector interface to interface to the connector horizontally from a surface of the substrate.

In a fifty-fifth example, an apparatus includes: a substrate having an array of light emitting diodes (LEDs) integrated into the substrate; and a controller to drive the array of LEDs with electrical communication signals; wherein the LEDs are to convert the electrical communication signals into optical signals to transmit on a plurality of optical waveguides.

In a fifty-sixth example in accordance with the fifty-fifth example, the LEDs comprise nanowire LEDs.

In a fifty-seventh example in accordance with any of the fifty-fifth to the fifty-sixth examples, each LED comprises an array of separately controllable nanowires.

In a fifty-eighth example in accordance with any of the fifty-fifth to the fifty-seventh examples, the LEDs comprise optical devices each having a footprint on the substrate of approximately less than 100 square microns (100 $\mu m^2$).

In a fifty-ninth example in accordance with any of the fifty-fifth to the fifty-eighth examples, the LEDs comprise bidirectional devices having a light emitting operation and a light detection operation.

In a sixtieth example in accordance with any of the fifty-fifth to the fifty-ninth examples, the plurality of optical waveguides comprises an optical fiber bundle.

In a sixty-first example in accordance with any of the fifty-fifth to the sixtieth examples, the optical fiber bundle includes multiple fiber cores to receive optical signals per optical source.

In a sixty-second example in accordance with any of the fifty-fifth to the sixty-first examples, the optical fiber bundle includes fiber cores to receive optical signals from multiple optical sources.

In a sixty-third example in accordance with any of the fifty-fifth to the sixty-second examples, the optical fiber bundle includes a fiber core to transmit optical signals of different wavelengths.

In a sixty-fourth example in accordance with any of the fifty-fifth to the sixty-third examples, the micro-scale optical sources include transmit optical sources to convert the electrical communication signals into optical signals and receive optical devices to receive input optical signals on the plurality of optical waveguides and convert the input optical signals into input electrical communication signals, and further includes a connector to house the optical fiber bundle to transmit the optical signals between the transmit optical sources and corresponding receive optical devices.

In a sixty-fifth example in accordance with any of the fifty-fifth to the sixty-fourth examples, the connector includes an alignment key to align fiber cores of the optical fiber bundle with the transmit optical sources and the receive optical sources.

In a sixty-sixth example in accordance with any of the fifty-fifth to the sixty-fifth examples, the controller is to generate control signals to implement optical signal training to adjust for alignment between fiber cores of the optical fiber bundle and the plurality of optical sources.

In a sixty-seventh example in accordance with any of the fifty-fifth to the sixty-sixth examples, the connector is to connect to an optical signal repeater to amplify and re-time the optical signals.

In a sixty-eighth example in accordance with any of the fifty-fifth to the sixty-seventh examples, the connector is to connect to an optical signal converter to convert the optical signals into laser-light optical signals.

In a sixty-ninth example in accordance with any of the fifty-fifth to the sixty-eighth examples, the apparatus includes: electrical signal lines to trigger signal training of the optical signals to an optical signal repeater or an optical signal converter.

In a seventieth example in accordance with any of the fifty-fifth to the sixty-ninth examples, the apparatus includes: a connector interface to interface to the connector vertically from a surface of the substrate.

In a seventy-first example in accordance with any of the fifty-fifth to the seventieth examples, the apparatus includes: a connector interface to interface to the connector horizontally from a surface of the substrate.

In a seventy-second example, a system includes: a connector to house a plurality of optical waveguides; and a substrate having an array of at least one hundred (100) optical devices integrated on the substrate, the optical devices including transmit optical sources to convert the electrical communication signals into optical signals to transmit on the plurality of optical waveguides, and receive optical devices to receive input optical signals on the plurality of optical waveguides and convert the input optical signals into input electrical communication signals.

In a seventy-third example in accordance with the seventy-second example, the optical devices comprise micro-LEDs (light emitting diodes).

In a seventy-fourth example in accordance with any of the seventy-second to the seventy-third examples, the optical devices comprise nanowire LEDs.

In a seventy-fifth example in accordance with any of the seventy-second to the seventy-fourth examples, the optical devices comprise micro-scale vertical cavity surface emitting lasers (VCSELs).

In a seventy-sixth example in accordance with any of the seventy-second to the seventy-fifth examples, the optical devices comprise bidirectional devices having a light emitting operation and a light detection operation.

In a seventy-seventh example in accordance with any of the seventy-second to the seventy-sixth examples, the optical waveguides comprise an optical fiber bundle having fiber cores to receive optical signals from multiple optical sources.

In a seventy-eighth example in accordance with any of the seventy-second to the seventy-seventh examples, the optical waveguides comprise an optical fiber bundle having a fiber core to transmit optical signals of different wavelengths.

In a seventy-ninth example in accordance with any of the seventy-second to the seventy-eighth examples, the connector is to connect to an optical signal repeater to extend a reach of the optical signals.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   a substrate having an array of light emitting diodes (LEDs) integrated into the substrate, wherein the array of LEDs is organized with multiple LEDs per pixel of a communication channel; and
   a controller to drive the array of LEDs with electrical communication signals, including driving the multiple LEDs of each pixel to set a value for each pixel;
   wherein the LEDs of the array of LEDs are to convert the electrical communication signals into optical signals to transmit on a plurality of optical waveguides, with the multiple LEDs of each pixel to transmit a combination of at least two different optical wavelengths to transmit the value for each pixel.

2. The apparatus of claim 1, wherein the LEDs comprise nanowire LEDs.

3. The apparatus of claim 2, wherein each LED comprises an array of separately controllable nanowires.

4. The apparatus of claim 1, wherein the LEDs comprise optical devices each having a footprint on the substrate of approximately less than 100 square microns (100 μm²).

5. The apparatus of claim 1, wherein the LEDs comprise bidirectional devices having a light emitting operation and a light detection operation.

6. The apparatus of claim 1, wherein the plurality of optical waveguides comprises an optical fiber bundle.

7. The apparatus of claim 6, wherein the optical fiber bundle includes multiple fiber cores to receive optical signals per optical source.

8. The apparatus of claim 6, wherein the optical fiber bundle includes fiber cores to receive optical signals from multiple optical sources.

9. The apparatus of claim 6, wherein the optical fiber bundle includes a fiber core to transmit optical signals of different wavelengths.

10. The apparatus of claim 6, wherein the LEDs include transmit diodes to convert the electrical communication signals into optical signals and further comprising receive photodetectors to receive input optical signals on the plurality of optical waveguides and convert the input optical signals into input electrical communication signals, and further comprising:
   a connector to house the optical fiber bundle to transmit the optical signals between the transmit diodes and corresponding receive photodetectors.

11. The apparatus of claim 10, wherein the connector includes an alignment key to align fiber cores of the optical fiber bundle with the transmit diodes and the receive photodetectors.

12. The apparatus of claim 10, wherein the controller is to generate control signals to implement optical signal training to adjust for alignment between fiber cores of the optical fiber bundle and the array of LEDs.

13. The apparatus of claim 10, wherein the connector is to connect to an optical signal repeater to amplify and re-time the optical signals.

14. The apparatus of claim 10, wherein the connector is to connect to an optical signal converter to convert the optical signals into laser-light optical signals.

15. The apparatus of claim 10, further comprising:
electrical signal lines to trigger signal training of the optical signals to an optical signal repeater or an optical signal converter.

16. The apparatus of claim 10, further comprising:
a connector interface to interface to the connector vertically from a surface of the substrate.

17. The apparatus of claim 10, further comprising:
a connector interface to interface to the connector horizontally from a surface of the substrate.

18. A system comprising:
a connector to house a plurality of optical waveguides; and
a substrate having an array of at least one hundred (100) optical devices integrated on the substrate, wherein the array of optical devices is organized with multiple optical devices per pixel of a communication channel, the optical devices including transmit optical sources to convert electrical communication signals into optical signals to transmit on the plurality of optical waveguides, with the multiple optical devices of each pixel to transmit a combination of at least two different optical wavelengths to transmit a value of each pixel, and receive optical devices to receive input optical signals on the plurality of optical waveguides and convert the input optical signals into input electrical communication signals.

19. The system of claim 18, wherein the optical devices comprise micro-LEDs (light emitting diodes).

20. The system of claim 19, wherein the optical devices comprise nanowire LEDs.

21. The system of claim 18, wherein the optical devices comprise vertical cavity surface emitting lasers (VCSELs).

22. The system of claim 18, wherein the optical devices comprise bidirectional devices having a light emitting operation and a light detection operation.

23. The system of claim 18, wherein the optical waveguides comprise an optical fiber bundle having fiber cores to receive optical signals from multiple optical sources.

24. The system of claim 18, wherein the optical waveguides comprise an optical fiber bundle having a fiber core to transmit optical signals of different wavelengths.

25. The system of claim 18, wherein the connector is to connect to an optical signal repeater to extend a reach of the optical signals.

* * * * *